United States Patent
Jang et al.

(10) Patent No.: US 12,452,447 B2
(45) Date of Patent: *Oct. 21, 2025

(54) MOTION VECTOR PREDICTION-BASED IMAGE/VIDEO CODING METHOD AND DEVICE

(71) Applicant: LG ELECTRONICS INC., Seoul (KR)

(72) Inventors: Hyeongmoon Jang, Seoul (KR); Naeri Park, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,293

(22) Filed: Jun. 6, 2024

(65) Prior Publication Data

US 2024/0340437 A1  Oct. 10, 2024

Related U.S. Application Data

(63) Continuation of application No. 17/618,826, filed as application No. PCT/KR2020/007744 on Jun. 15, 2020, now Pat. No. 12,034,961.

(Continued)

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/109* (2014.11);
(Continued)

(58) Field of Classification Search
CPC .. H04N 19/513; H04N 19/105; H04N 19/109; H04N 19/132; H04N 19/139;
(Continued)

(56) References Cited

U.S. PATENT DOCUMENTS

2015/0103915 A1   4/2015  Xu et al.
2017/0195677 A1   7/2017  Ye et al.

FOREIGN PATENT DOCUMENTS

CN        1589024 A      3/2005

*Primary Examiner* — Boubacar Abdou Tchoussou
(74) *Attorney, Agent, or Firm* — Bryan Cave Leighton Paisner LLP

(57) ABSTRACT

An image decoding method according to the present document comprises: decoding a current block on the basis of image information, wherein an MVP candidate list for the current block is derived on the basis of an inter prediction mode, which is derived on the basis of image information, and peripheral blocks of the current block; and deriving motion information of the current block on the basis of the MVP candidate list, wherein the peripheral blocks include a left bottom corner peripheral block, a left peripheral block, a right top corner peripheral block, a top peripheral block, and a left top corner peripheral block of the current block, the motion information includes an L0 motion vector for L0 prediction and/or an L1 motion vector for L1 prediction, the L0 motion vector is derived on the basis of an L0 motion vector predictor and an L0 motion vector difference, and the L1 motion vector is derived on the basis of an L1 motion vector predictor and an L1 motion vector difference.

9 Claims, 14 Drawing Sheets

Related U.S. Application Data

(60) Provisional application No. 62/861,321, filed on Jun. 13, 2019.

(51) Int. Cl.
    *H04N 19/109*  (2014.01)
    *H04N 19/132*  (2014.01)
    *H04N 19/139*  (2014.01)
    *H04N 19/159*  (2014.01)
    *H04N 19/176*  (2014.01)
    *H04N 19/70*   (2014.01)

(52) U.S. Cl.
    CPC ......... *H04N 19/132* (2014.11); *H04N 19/139* (2014.11); *H04N 19/159* (2014.11); *H04N 19/176* (2014.11); *H04N 19/70* (2014.11)

(58) Field of Classification Search
    CPC .... H04N 19/159; H04N 19/176; H04N 19/70; H04N 19/52; H04N 19/577; H04N 19/573
    See application file for complete search history.

MOTION VECTOR PREDICTION-BASED IMAGE/VIDEO CODING METHOD AND DEVICE

CROSS-REFERENCE TO RELATED APPLICATIONS

This application is a Continuation of U.S. patent application Ser. No. 17/618,826, filed Dec. 13, 2021; which is a National Stage Application of International Application No. PCT/KR2020/007744, filed Jun. 15, 2020; which claims the benefit of U.S. Provisional Application No. 62/861,321, filed Jun. 13, 2019, which are hereby incorporated by reference in their entirety for all purposes as if fully set forth herein.

BACKGROUND OF DISCLOSURE

Field of the Disclosure

This document relates to a motion vector prediction-based image/video coding method and apparatus therefor.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

According to an embodiment of this document, there are provided a method and apparatus which increase image/video coding efficiency.

According to an embodiment of this document, there are provided a method and an apparatus which efficiently perform inter prediction in an image/video coding system.

According to an embodiment of this document, a method and apparatus for performing inter prediction based on motion vector prediction are provided.

According to an embodiment of this document, there are provided a method and apparatus which signal information about a motion vector difference in inter prediction.

According to an embodiment of this document, there are provided a method and apparatus which signal prediction-related information when bi-prediction is applied to a current block.

According to an embodiment of this document, there are provided a method and apparatus which signal a L1 motion vector difference zero flag and/or a SMVD flag.

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to an embodiment of the present document, a computer-readable digital storage medium storing encoded video/image information generated according to the video/image encoding method disclosed in at least one of the embodiments of this document is provided.

According to an embodiment of the present document, a computer-readable digital storage medium storing encoded information or encoded video/image information causing a decoding apparatus to perform the video/image decoding method disclosed in at least one of the embodiments of this document is provided.

According to this document, it is possible to improve overall image/video compression efficiency.

According to this document, it is possible to signal information on motion vector difference efficiently.

According to this document, it is possible to derive an L1 motion vector difference efficiently when bi-prediction is applied to a current block.

According to this document, it is possible to reduce the complexity of a coding system by efficiently signaling information used for deriving an L1 motion vector difference.

According to this document, bit waste that may occur in information signaling regarding the inter prediction mode can be avoided, and overall coding efficiency can be increased.

Effects that can be obtained through a detailed example of the present document are not limited to the effects enumerated above. For example, there may be various technical effects that can be understood or induced by a person having ordinary skill in the related art from the present document. Accordingly, the detailed effects of the present document are not limited to those explicitly stated in the present document, but may include various effects that can be understood or induced from the technical features of the present document.

DESCRIPTION OF EMBODIMENTS

Figure 1:
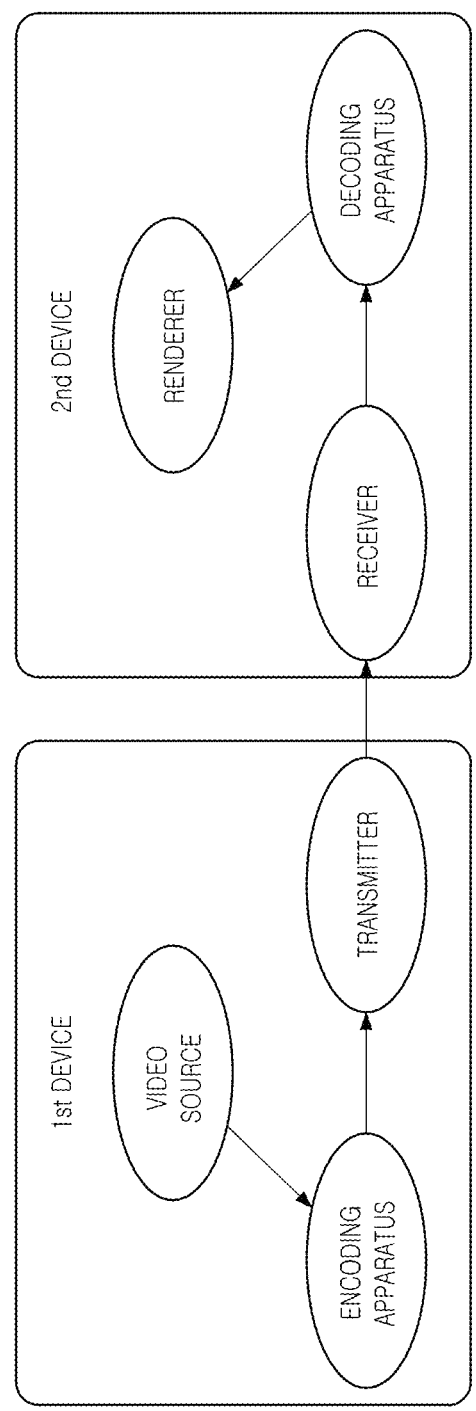
FIG. 1 schematically illustrates an example of a video/image coding system to which the present document is applicable.

The disclosure of the present document may be modified in various forms, and specific embodiments thereof will be described and illustrated in the drawings. However, the embodiments are not intended for limiting the disclosure. The terms used in the following description are used to merely describe specific embodiments, but are not intended to limit the embodiment of the present document. An expression of a singular number includes an expression of the plural number, so long as it is clearly read differently. The terms such as "include" and "have" are intended to indicate that features, numbers, steps, operations, elements, components, or combinations thereof used in the present document exist and it should be thus understood that the possibility of existence or addition of one or more different features, numbers, steps, operations, elements, components, or combinations thereof is not excluded.

In addition, each configuration of the drawings described in this document is an independent illustration for explaining functions as features that are different from each other, and does not mean that each configuration is implemented by mutually different hardware or different software. For example, two or more of the configurations can be combined to form one configuration, and one configuration can also be divided into multiple configurations. Embodiments in which configurations are combined and/or separated are included in the scope of the disclosure of the present document.

This document relates to video/image coding. For example, methods/embodiments disclosed in this document may be related to the versatile video coding (VVC) standard. In addition the method/embodiment disclosed in the present document may be related to the essential video coding (EVC) standard, AOMedia video 1 (AV1) standard, 2nd generation of audio video coding standard (AVS2) or the next-generation video/image coding standard (e.g., H.267 or H.268 etc)

This document suggests various embodiments of video/image coding, and the above embodiments may also be performed in combination with each other unless otherwise specified.

Hereinafter, embodiments of the present document will be described with reference to the accompanying drawings. Hereinafter, the same reference numerals may be used for the same components in the drawings, and repeated descriptions of the same components may be omitted.

FIG. 1 illustrates an example of a video/image coding system to which the embodiments of the present document may be applied.

Referring to FIG. 1, a video/image coding system may include a first device (source device) and a second device (reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit Meanwhile, one picture may be divided into two or more subpictures. An rectangular region of one or more slices within a picture A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In this document, the term "A or B" may mean "only A", "only B" or "both A and B.". In other words, "A or B" in this document may be interpreted as "A and/or B." For instance, should be interpreted to indicate "and/or." For example, in this document "A, B or C" may mean "only A", "only B", "only C", or "any combination of A, B and C."

In this document, the term "/" and "," may mean "and/or." For instance, the expression "A/B" may mean "A and/or B." Accordingly, "A/B" may mean "only A", "only B", or "both A and B." For example, "A, B, C" may mean "A, B, or C."

In the present document, "at least one of A and B" may mean "only A", "only B", or "both A and B". Further, in the present document, the expression "at least one of A or B" or "at least one of A and/or B" may be interpreted the same as "at least one of A and B".

Further, in the present document, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present document may mean "for example". Specifically, in the case that "prediction (intra prediction)" is expressed, it may be indicated that "intra prediction" is proposed as an example of "prediction". In other words, the term "prediction" in the present document is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In the present document, technical features individually explained in one drawing may be individually implemented, or may be simultaneously implemented.

Figure 2:
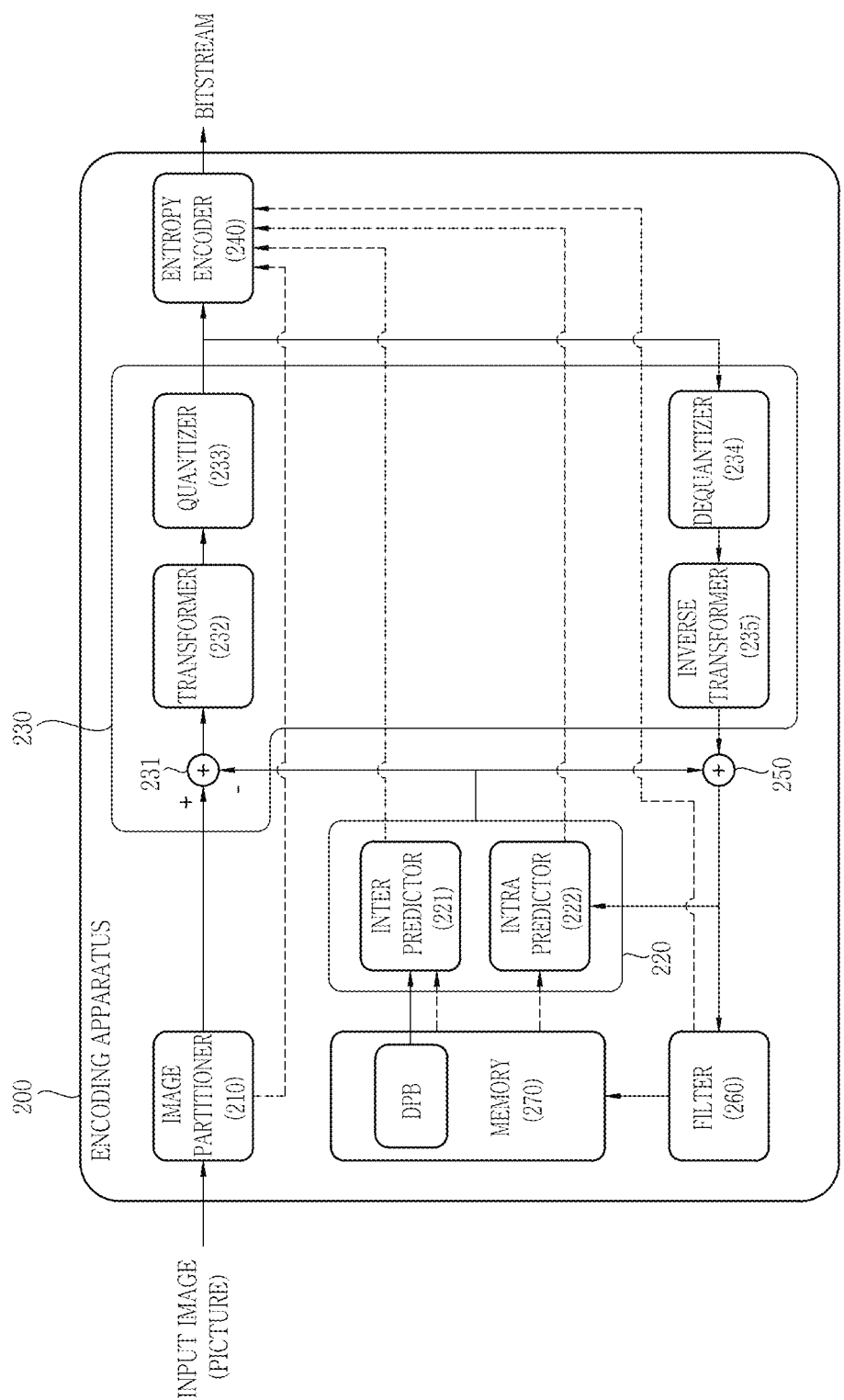
FIG. 2 is a diagram schematically explaining the configuration of a video/image encoding apparatus to which the present document is applicable.

FIG. 2 is a diagram schematically illustrating the configuration of a video/image encoding apparatus to which the embodiments of the present document may be applied. Hereinafter, what is referred to as the encoding apparatus may include an image encoding apparatus and/or a video encoding apparatus. Also, what is referred to as an image encoding method/apparatus may include a video encoding method/apparatus. Or, what is referred to as a video encoding method/apparatus may include an image encoding method/apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block or residual sample array) by subtracting a prediction signal (predicted block or prediction sample array) output from the inter predictor 221 or intra predictor 222 from an input image signal (original block or original sample array), and the generated residual signal is transmitted to the transformer 232. In this case, as shown, a unit for subtracting the prediction signal (prediction block or prediction sample array) from an input image signal (original block or original sample array) in the encoder 200 may be referred to as the subtractor 231. The predictor may perform prediction for a processing target block (hereinafter, referred to as a "current block"), and generate a predicted block including prediction samples for the current block. The predictor may determine whether intra prediction or inter prediction is applied on a current block or in a CU unit. As described later in the description of each prediction mode, the predictor may generate various kinds of information related to prediction, such as prediction mode information, and transfer the generated information to the entropy encoder 240. The information on the prediction may be encoded in the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may based on an intra block copy (IBC) prediction mode or based on a palette mode for prediction of a block. The IBC prediction mode or the palette mode may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document. The palette mode may be considered as an example of intra coding or intra prediction. When the palette mode is applied, the sample value in the picture may be signaled based on information about a palette table and a palette index.

The prediction signal generated through the predictor (comprising the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to the transform obtained based on a prediction signal generated using all previously reconstructed pixels. In addition, the transform process may be applied to square pixel blocks having the same size, or may be applied to blocks having a variable size rather than a square.

The quantizer 233 may quantize the transform coefficients and transmit them to the entropy encoder 240, and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order, and generate information on the quantized transform coefficients based on the quantized transform coefficients in the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction together with or separately from the quantized transform coefficients (e.g., values of syntax elements and the like). Encoded information (e.g., encoded image/video information) may be transmitted or stored in the unit of a network abstraction layer (NAL) in the form of a bitstream. The image/video information may further include information on various parameter sets, such as an adaptation parameter set (APS), a picture parameter set (PPS), a sequence parameter set (SPS), or a video parameter set (VPS). In addition, the image/video information may further include general constraint information. In the present document, information and/or syntax elements being transferred/signaled from the encoding apparatus to the decoding apparatus may be included in the image/video information. The image/video information may be encoded through the above-described encoding procedure, and be included in the bitstream. The bitstream may be transmitted through a network, or may be stored in a digital storage medium. Here, the network may include a broadcasting network and/or a communication network, and the digital storage medium may include various storage media, such as USB, SD, CD, DVD, Blu-ray, HDD, SSD, and the like. A transmitter (not illustrated) transmitting a signal output from the entropy encoder 240 and/or a storage unit (not illustrated) storing the signal may be configured as an internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the processing target block, such as a case that a skip mode is applied, the predicted block may be used as the reconstructed block. The adder 250 may be called a reconstructor or a reconstruction block generator. The generated reconstructed signal may be used for intra prediction of a next processing target block in the current picture, and may be used for inter prediction of a next picture through filtering as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset, an adaptive loop filter, a bilateral filter, and the like. The filter 260 may generate various kinds of information related to the filtering, and transfer the generated information to the entropy encoder 290 as described later in the description of each filtering method. The information related to the filtering may be encoded by the entropy encoder 290 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus can be avoided and encoding efficiency can be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Figure 3:
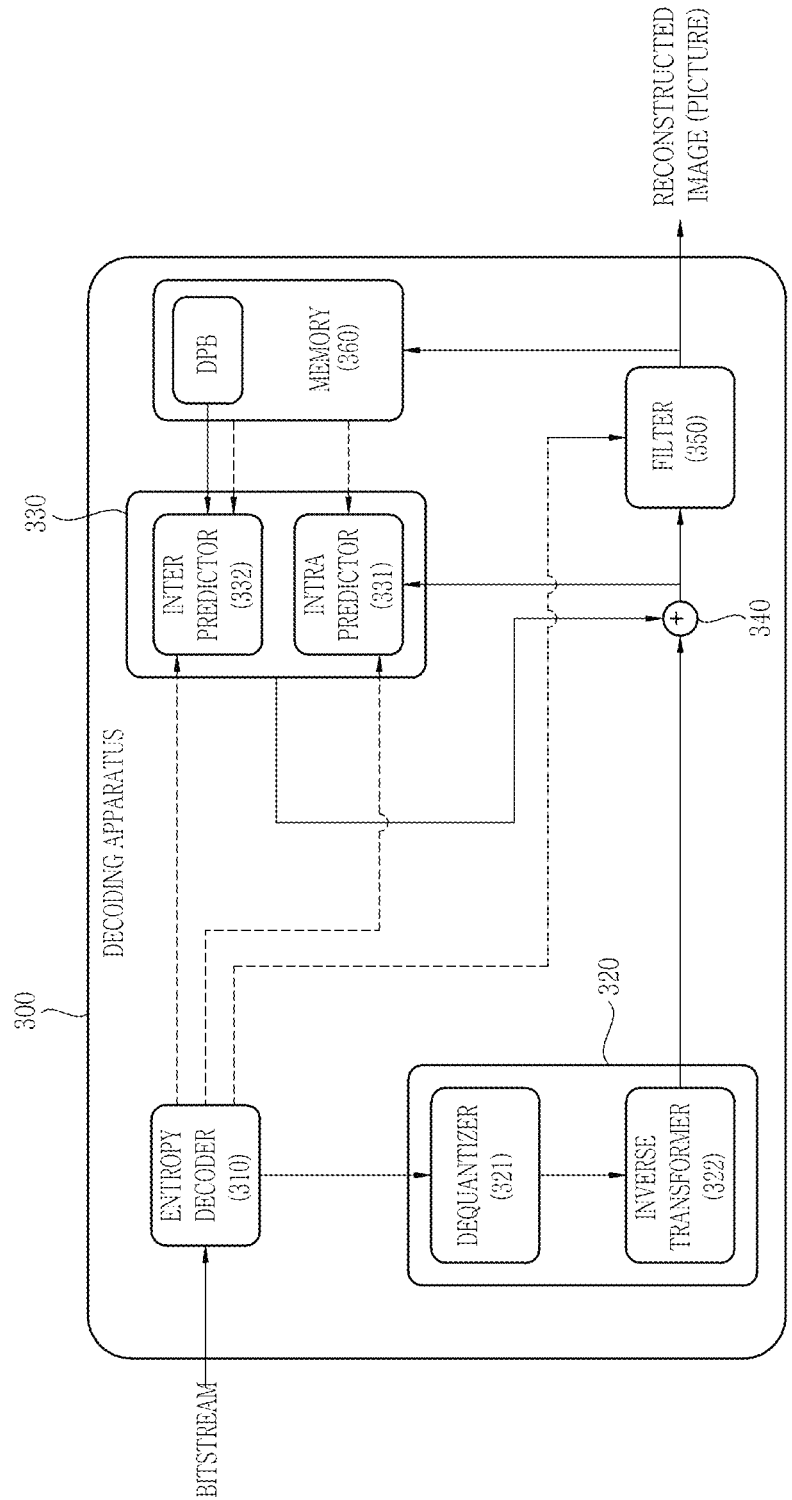
FIG. 3 is a diagram schematically explaining the configuration of a video/image decoding apparatus to which the present document is applicable.

FIG. 3 is a diagram for schematically explaining the configuration of a video/image decoding apparatus to which the disclosure of the present document may be applied. Hereinafter, what is referred to as the decoding apparatus may include an image decoding apparatus and/or a video decoding apparatus. Also, what is referred to as an image decoding method/apparatus may include a video decoding method/apparatus. Or, what is referred to as a video decoding method/apparatus may include an image decoding method/apparatus.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the image/video information is input, the decoding apparatus 300 may reconstruct the image in response to a process in which the image/video information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., image/video information) necessary for image reconstruction (or picture reconstruction). The image/video information may further include information on various parameter sets such as an adaptation parameter set (APS), a picture parameter set (PPS), a sequence parameter set (SPS), or a video parameter set (VPS). In addition, the image/video information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the inter predictor predictor 332 and intra predictor 331, and the residual values on which the entropy decoding has been performed in the entropy decoder 310, that is, the quantized transform coefficients and related parameter information, may be input to the residual processor 320. The residual processor 320 may derive a residual signal (residual block, residual samples, residual sample array). In addition, information on filtering among information decoded by the entropy decoder 310 may be provided to the filter 350. Meanwhile, a receiver (not illustrated) for receiving a signal output from the encoding apparatus may be further configured as an internal/external element of the decoding apparatus 300, or the receiver may be a constituent element of the entropy decoder 310. Meanwhile, the decoding apparatus according to the present document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332 and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may based on an intra block copy (IBC) prediction mode or based on a palette mode for prediction of a block. The IBC prediction mode or the palette mode may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document. The palette mode may be considered as an example of intra coding or intra prediction. When the palette mode is applied, information about a palette table and a palette index may be included in the image/video information and signaled.

The intra predictor 331 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 331 may determine the prediction mode to be applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 332 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the inter predictor 332 and/or the intra predictor 331. If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture having already been reconstructed. The stored motion information may be transferred to the inter predictor 332 so as to be utilized as the motion information of the spatial neighboring block or the motion information of the temporal neighboring block. The memory 360 may store reconstructed samples of reconstructed blocks in the current picture, and transfer the reconstructed samples to the intra predictor 331.

In this document, the embodiments described with regard to the filter 260, the inter predictor 221, and the intra predictor 222 of the encoding apparatus 200 may be commonly or correspondingly applied to the filter 350, inter predictor 332 and intra predictor 331, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

The predictor of the encoding apparatus/decoding apparatus may perform the inter prediction in units of blocks and derive the prediction sample. Inter prediction can be a prediction derived in a manner that is dependent on data elements (e.g., sample values or motion information) of picture(s) other than the current picture. When inter prediction is applied to the current block, a predicted block (prediction sample array) for the current block may be derived based on a reference block (reference sample array) specified by a motion vector on a reference picture which a reference picture index indicates. At this time, in order to reduce the amount of motion information transmitted in the inter prediction mode, the motion information of the current block may be predicted in units of blocks, subblocks, or samples, based on correlation of motion information between the neighboring block and the current block. The motion information may include a motion vector and a reference picture index. The motion information may further include inter prediction type (L0 prediction, L1 prediction, Bi prediction, etc.) information. When inter prediction is applied, the neighboring block may include a spatial neighboring block existing in the current picture and a temporal neighboring block existing in the reference picture. The reference picture including the reference block, and the reference picture including the temporal neighboring block may be the same to each other or different from each other. The temporal neighboring block may be called a collocated reference block, a collocated CU (colCU), and the like, and the reference picture including the temporal neighboring block may be called a collocated picture (colPic). For example, motion information candidate list may be configured based on neighboring blocks of the current block, and a flag or index information indicating which candidate is selected (used) in order to derive a motion vector and/or a reference picture index of the current block may be signaled. Inter prediction may be performed based on various prediction modes. For example, in the case of a skip mode and a merge mode, motion information of the current block may be the same as motion information of the selected neighboring block. In the skip mode, unlike the merge mode, the residual signal may not be transmitted. In the case of motion information prediction (motion vector prediction (MVP)) mode, a motion vector of the selected neighboring block may be used as a motion vector predictor, and a motion vector difference may be signaled. In this case, a motion vector of the current block may be derived using the sum of the motion vector predictor and motion vector difference.

The motion information may include L0 motion information and/or L1 motion information according to an inter prediction type (L0 prediction, L1 prediction, Bi prediction, etc.). A motion vector in the L0 direction may be referred to as an L0 motion vector or MVL0, while a motion vector in the L1 direction may be referred to as an L1 motion vector or MVL1. The prediction based on the L0 motion vector may be referred to as L0 prediction; the prediction based on the L1 motion vector may be referred to as L1 prediction; and the prediction based on both the L0 motion vector and the L1 motion vector may be referred to as a bi-prediction. Here, the L0 motion vector may indicate a motion vector associated with the reference picture list L0 (L0), and the L1 motion vector may indicate a motion vector associated with the reference picture list L1 (L1). The reference picture list L0 may include, as reference pictures, pictures that are earlier than the current picture in output order, and the reference picture list L1 may include pictures that are later than the current picture in output order. The previous pictures may be referred to as forward direction (reference) pictures, and the subsequent pictures may be referred to as backward direction (reference) pictures. The reference picture list L0 may further include, as reference pictures, pictures that are later than the current picture in output order. In this case, in the reference picture list L0, the previous pictures may be indexed first, and then the subsequent pictures may be indexed. The reference picture list L1 may further include, as reference pictures, pictures that are earlier than the current picture in output order. In this case, in the reference picture list 1, the subsequent pictures may be indexed first, and then the previous pictures may be indexed. Here, the output order may correspond to picture order count (POC) order.

A video/image encoding procedure based on inter prediction may schematically include, for example, the following.

Figure 4:
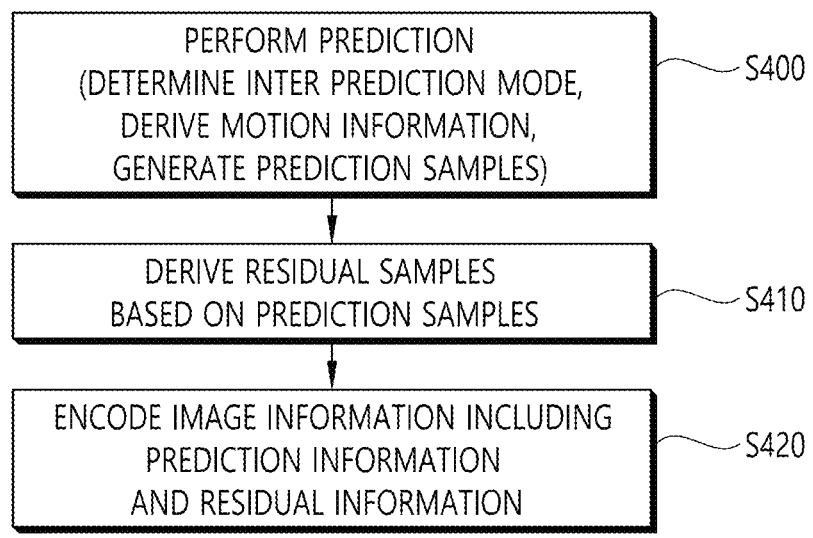
FIG. 4 shows an example of a video/image encoding based on inter prediction.

FIG. 4 shows an example of a video/image encoding based on inter prediction.

The encoding apparatus performs inter prediction on the current block (S400). The encoding apparatus may derive the inter prediction mode and motion information of the current block, and generate prediction samples of the current block. Here, the procedures for determining the inter prediction mode, deriving motion information, and generating prediction samples may be performed simultaneously, or one procedure may be performed before another procedure. For example, the inter predictor of the encoding apparatus may include a prediction mode determiner, a motion information deriver, and a prediction sample deriver, the prediction mode determiner determines the prediction mode for the current block, the motion information deriver derive the motion information of the current block, and the prediction sample deriver derives prediction samples of the current block. For example, the inter predictor of the encoding apparatus searches for a block similar to the current block within a predetermined area (search area) of reference pictures through motion estimation, and derive a reference block of which difference from the current block is a minimum or within a predetermined criterion. Based on this, a reference picture index indicating a reference picture in which the reference block is located may be derived, and a motion vector may be derived based on a position difference between the reference block and the current block. The encoding apparatus may determine a mode applied to the current block from among various prediction modes. The encoding apparatus may compare RD costs for the various prediction modes and determine an optimal prediction mode for the current block.

For example, when a skip mode or a merge mode is applied to the current block, the encoding apparatus constructs a merge candidate list to be described later, and among reference blocks indicated by merge candidates included in the merge candidate list, a reference block having a difference from the current block is a minimum or equal to or less than a predetermined criterion may be derived. In this case, a merge candidate associated with the derived reference block may be selected, and merge index information indicating the selected merge candidate may be generated and signaled to the decoding apparatus. Motion information of the current block may be derived using the motion information of the selected merge candidate.

As another example, when the (A) MVP mode is applied to the current block, the encoding apparatus constructs an (A) MVP candidate list to be described later, and among motion vector predictor (mvp) candidates included in the (A) MVP candidate list, a motion vector of the selected mvp candidate may be used as the mvp of the current block. In this case, for example, a motion vector indicating to the reference block derived by the above-described motion estimation may be used for the motion vector of the current block, and an mvp candidate having the smallest difference from the motion vector of the current block among the mvp candidates may be the selected mvp candidate. A motion vector difference (MVD) that is a difference obtained by subtracting the mvp from the motion vector of the current block may be derived. In this case, the information on the MVD may be signaled to the decoding apparatus. In addition, when the (A) MVP mode is applied, the value of the reference picture index may be separately signaled to the decoding apparatus by configuring reference picture index information.

The encoding apparatus may derive residual samples based on the prediction samples (S410). The encoding apparatus may derive the residual samples by comparing the original samples of the current block with the prediction samples.

The encoding apparatus encodes image information including prediction information and residual information (S420). The encoding apparatus may output encoded image information in the form of a bitstream. The prediction information is information related to the prediction procedure, and may include prediction mode information (eg, skip flag, merge flag, or mode index, etc.) and information on the motion information. The information on the motion information may include candidate selection information (eg, merge index, mvp flag, or mvp index) that is information for deriving a motion vector. In addition, the information on the motion information may include the above-described information on the MVD and/or reference picture index information. In addition, the information on the motion information may include information indicating whether L0 prediction, L1 prediction, or bi prediction is applied. The residual information is information on the residual samples. The residual information may include information on quantized transform coefficients for the residual samples.

The output bitstream may be stored in a (digital) storage medium and transmitted to a decoding apparatus, or may be transmitted to a decoding apparatus through a network.

Meanwhile, as described above, the encoding apparatus may generate a reconstructed picture (including reconstructed samples and reconstructed blocks) based on the reference samples and the residual samples. This is because the encoding apparatus can derive the same prediction result as that performed by the decoding apparatus, and through this, coding efficiency can be increased. Accordingly, the encoding apparatus may store the reconstructed picture (or reconstructed samples, reconstructed block) in a memory and use it as a reference picture for inter prediction. As described above, an in-loop filtering procedure may be further applied to the reconstructed picture.

A video/image decoding procedure based on inter prediction may schematically include, for example, the following.

Figure 5:
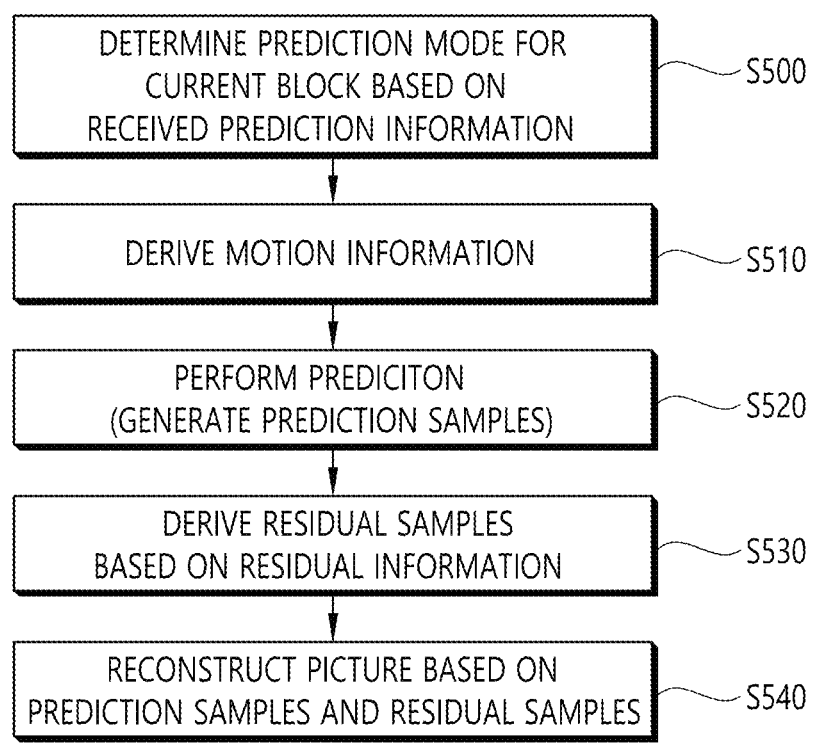
FIG. 5 shows an example of a video/image decoding method based on inter prediction.

FIG. 5 shows an example of a video/image decoding method based on inter prediction.

Referring to FIG. 5, the decoding apparatus may perform an operation corresponding to the operation performed by the encoding apparatus. The decoding apparatus may perform prediction on the current block based on the received prediction information and derive prediction samples.

Specifically, the decoding apparatus may determine the prediction mode for the current block based on the received prediction information (S500). The decoding apparatus may determine which inter prediction mode is applied to the current block based on prediction mode information in the prediction information.

For example, based on the merge flag, it may be determined whether the merge mode or the (A) MVP mode is applied to the current block is determined. Alternatively, one of various inter prediction mode candidates may be selected based on the mode index. The inter prediction mode candidates may include skip mode, merge mode, and/or (A) MVP mode, or may include various inter prediction modes to be described later.

The decoding apparatus derives motion information of the current block based on the determined inter prediction mode (S510). For example, when the skip mode or the merge mode is applied to the current block, the decoding apparatus may configure a merge candidate list to be described later, and may select one merge candidate from among merge candidates included in the merge candidate list. The selection may be performed based on the above-described selection information (merge index). Motion information of the current block may be derived using the motion information of the selected merge candidate. The motion information of the selected merge candidate may be used as the motion information of the current block.

As another example, when the (A) MVP mode is applied to the current block, the decoding apparatus constructs an (A) MVP candidate list to be described later, and among motion vector predictor (mvp) candidates included in the (A) MVP candidate list. The motion vector of the selected mvp candidate may be used as the mvp of the current block. The selection may be performed based on the above-described selection information (mvp flag or mvp index). In this case, the MVD of the current block may be derived based on the information on the MVD, and the motion vector of the current block may be derived based on the mvp of the current block and the MVD. Also, the reference picture index of the current block may be derived based on the reference picture index information. A picture indicated by the reference picture index in the reference picture list for the current block may be derived as a reference picture referenced for inter prediction of the current block.

Meanwhile, as will be described later, the motion information of the current block may be derived without configuring a candidate list, and in this case, the motion information of the current block may be derived according to a procedure disclosed in a prediction mode to be described later. In this case, the candidate list configuration as described above may be omitted.

The decoding apparatus may generate prediction samples for the current block based on the motion information of the current block (S520). In this case, the reference picture may be derived based on the reference picture index of the current block, and the prediction samples of the current block may be derived using samples of the reference block indicated by the motion vector of the current block on the reference picture. In this case, as described later, a prediction sample filtering procedure for all or some of the prediction samples of the current block may be further performed depending on the case.

For example, the inter predictor of the decoding apparatus may include a prediction mode determiner, a motion information deriver, and a prediction sample deriver, and the prediction mode determiner determines the prediction mode for the current block based on the received prediction mode information, the motion information deriver derives the motion information (motion vector and/or reference picture index, etc.) of the current block based on received information on the motion information, and the prediction sample deriver derives prediction samples of the current block.

The decoding apparatus generates residual samples for the current block based on the received residual information (S530). The decoding apparatus may generate reconstructed samples for the current block based on the prediction samples and the residual samples, and generate a reconstructed picture based thereon (S540). Thereafter, as described above, an in-loop filtering procedure may be further applied to the reconstructed picture.

Figure 6:
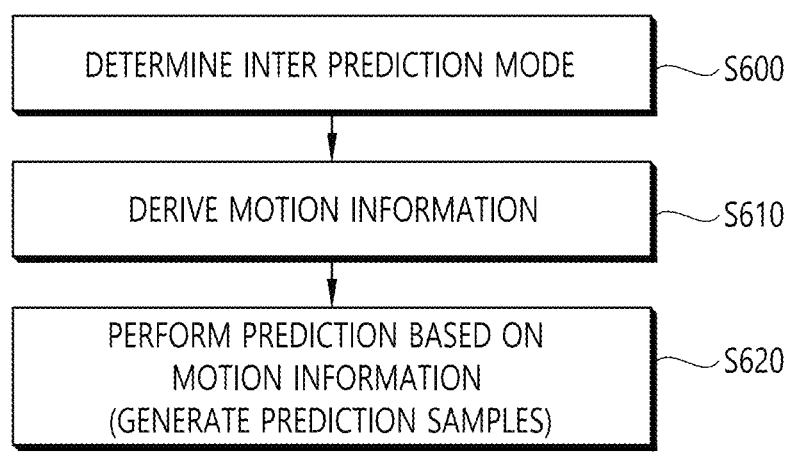
FIG. 6 exemplarily shows an inter prediction procedure.

FIG. 6 exemplarily shows an inter prediction procedure.

Referring to FIG. 6, the inter prediction procedure may include determining an inter prediction mode, deriving motion information according to the determined prediction mode, and performing prediction (generation of a prediction sample) based on the derived motion information. The inter prediction procedure may be performed by the encoding apparatus and the decoding apparatus as described above. In this document, a coding apparatus may include an encoding apparatus and/or a decoding apparatus.

Referring to FIG. 6, the coding apparatus determines an inter prediction mode for a current block (S600). Various inter prediction modes may be used for prediction of the current block in a picture. For example, a variety of modes, such as a merge mode, a skip mode, a motion vector prediction (MVP) mode, an affine mode, a subblock merge mode, a merge with MVD (MMVD) mode or the like, may be used. A decoder side motion vector refinement (DMVR) mode, an adaptive motion vector resolution (AMVR) mode, bi-prediction with CU-level weight (VCW), bi-predictional optical flow (OBDF) or the like may be used additionally or alternatively as an auxiliary mode. The affine mode may be referred to as an affine motion prediction mode. The MVP mode may be referred to as an advanced motion vector prediction (AMVP) mode. In this document, some modes and/or a motion information candidate derived by some modes may be included as one of candidates relating to motion information of another mode. For example, the HMVP candidate may be added as a merge candidate of the merge/skip mode, or may be added as an mvp candidate of the MVP mode. When the HMVP candidate is used as a motion information candidate of the merge mode or skip mode, the HMVP candidate may be referred to as an HMVP merge candidate.

The prediction mode information indicating the inter prediction mode of the current block may be signaled from the encoding apparatus to the decoding apparatus. The prediction mode information may be included in a bitstream and received at the decoding apparatus. The prediction mode information may include index information indicating one of multiple candidate modes. Further, the inter prediction mode may be indicated through hierarchical signaling of flag information. In this case, the prediction mode information may include one or more flags. For example, it may be indicated whether the skip mode is applied by signaling the skip flag; it may be indicated whether the merge mode is applied by signaling the merge flag for the skip mode not being applied; and it may be indicated that the MVP mode is applied or a flag for further partition may be further signaled when the merge mode is not applied. The affine mode may be signaled as an independent mode, or may be signaled as a mode dependent on the merge mode, the MVP mode or the like. For example, the affine mode may include an affine merge mode and an affine MVP mode.

The coding apparatus derives motion information for the current block (S610). The motion information may be derived based on the inter prediction mode.

The coding apparatus may perform innter prediction using motion information of the current block. The encoding apparatus may derive optimal motion information for the current block through a motion estimation procedure. For example, the encoding apparatus may search for a similar reference block of a high correlation in a predetermined search range in a reference picture in a fractional pixel unit using an original block in an original picture for the current block, and may derive motion information through this. Similarity of a block may be derived based on a difference between phase-based sample values. For example, similarity of a block may be calculated based on SAD between the current block (or template of the current block) and the reference block (or template of the reference block). In this case, the motion information may be derived based on the reference block having the smallest SAD in a search region. The derived motion information may be signaled to the decoding apparatus according to various methods based on inter prediction mode.

The coding apparatus performs the inter prediction based on the motion information on the current block (S620). The coding apparatus may derive prediction sample(s) for the current block based on the motion information. The current block including the prediction samples may be referred to as a predicted block.

Meanwhile, information indicating whether or not the above-described list0 (L0) prediction, list1 (L1) prediction, or bi-prediction is used in the current block (current coding unit) may be signaled to the current block. Said information may be referred to as motion prediction direction information, inter prediction direction information, or inter prediction indication information, and may be constructed/encoded/signaled in the form of, for example, an inter_pred_idc syntax element. That is, the inter_pred_idc syntax element may indicate whether or not the above-described list0 (L0) prediction, list 1 (L1) prediction, or bi-prediction is used for the current block (current coding unit). In this document, for convenience of description, the inter prediction type (L0 prediction, L1 prediction, or BI prediction) indicated by the inter_pred_idc syntax element may be represented as a motion prediction direction. L0 prediction may be represented by pred_L0; L1 prediction may be represented by pred_L1; and bi-prediction may be represented by pred_BI.

One picture may include one or more slices. A slice may have one of the slice types including intra (I) slice, predictive (P) slice, and bi-predictive (B) slice. The slice type may be indicated based on slice type information. For blocks in I slice, inter prediction is not used for prediction, and only intra prediction may be used. Of course, even in this case, the original sample value may be coded and signaled without prediction. For blocks in P slice, intra prediction or inter prediction may be used, and when inter prediction is used, only uni prediction may be used. Meanwhile, intra prediction or inter prediction may be used for blocks in B slice, and when inter prediction is used, up to the maximum bi-prediction may be used.

L0 and L1 may include reference pictures encoded/decoded before the current picture. For example, L0 may include reference pictures before and/or after the current picture in POC order, and L1 may include reference pictures after and/or before the current picture in POC order. In this case, a reference picture index lower relative to reference pictures earlier than the current picture in POC order may be allocated to L0, and a reference picture index lower relative to reference pictures later than the current picture in POC order may be allocated to L1. In the case of B slice, bi-prediction may be applied, and in this case, unidirectional bi-prediction may be applied, or bi-directional bi-prediction may be applied. Bi-directional bi-prediction may be referred to as true bi-prediction.

Specifically, for example, information about the inter prediction mode of the current block may be coded and signaled at a CU (CU syntax) level or the like, or may be implicitly determined according to a condition. In this case, some modes may be explicitly signaled, and other modes may be implicitly derived.

Figure 7:
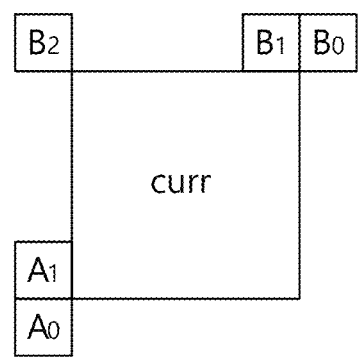
FIG. 7 exemplarily shows spatial neighboring blocks used for deriving motion information candidates in an MVP mode.

FIG. 7 exemplarily shows spatial neighboring blocks used for deriving motion information candidates in an MVP mode.

The motion vector prediction (MVP) mode may be referred to as an advanced motion vector prediction (AMVP) mode. When the MVP mode is applied, a motion vector predictor (MVP) candidate list may be generated using a motion vector of the reconstructed spatial neighboring block (e.g., the neighboring block of FIG. 5 may be included) and/or a motion vector corresponding to the temporal neighboring block (or Col block). That is, the motion vector of a reconstructed spatial neighboring block, and/or the motion vector corresponding to the temporal neighboring block may be used as a motion vector predictor candidate. The spatial neighboring blocks may include a bottom-left corner neighboring block A0, a left neighboring block A1, a top-right corner neighboring block B0, a top neighboring block B1, and a top-left corner neighboring block B2 of the current block.

When bi-prediction is applied, an mvp candidate list for deriving L0 motion information and an mvp candidate list for deriving L1 motion information may be separately generated and used. The above-described prediction information (or information on prediction) may include selection information (eg, MVP flag or MVP index) indicating an optimal motion vector predictor candidate selected from among the motion vector predictor candidates included in the list. In this case, the predictor may select the motion vector predictor of the current block from among the motion vector predictor candidates included in the motion vector candidate list by using the selection information. The predictor of the encoding apparatus may obtain a motion vector difference (MVD) between the motion vector of the current block and the motion vector predictor and encode it to output in the form of a bitstream. That is, the MVD may be obtained by subtracting the motion vector predictor from the motion vector of the current block. In this case, the predictor of the decoding apparatus may obtain a motion vector difference included in the information on the prediction, and derive the motion vector of the current block by adding the motion vector difference and the motion vector predictor. The predictor of the decoding apparatus may obtain or derive a reference picture index indicating a reference picture from the information on the prediction.

Figure 8:
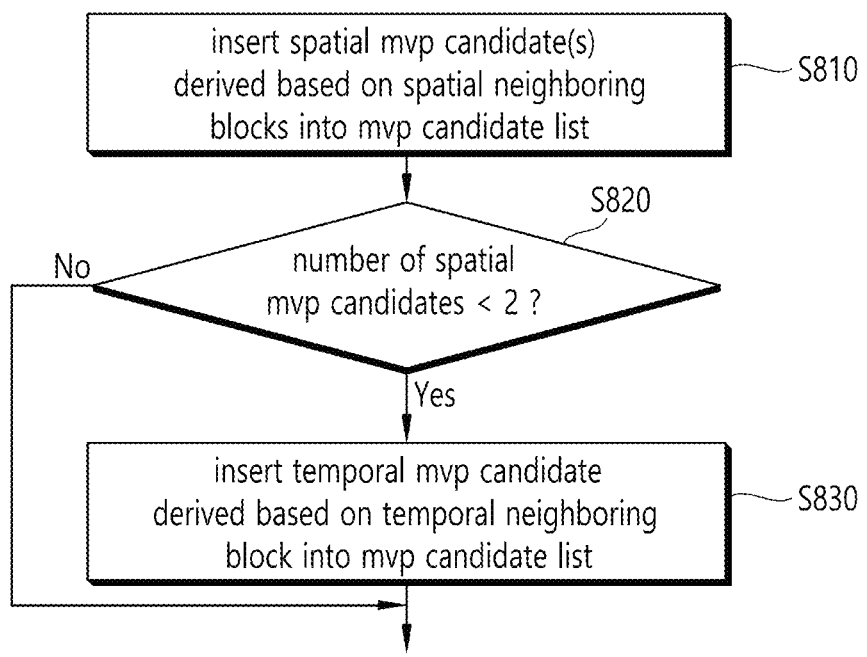
FIG. 8 schematically represents a method for constructing an MVP candidate list according to this document.

FIG. 8 schematically represents a method for constructing an MVP candidate list according to this document.

Referring to FIG. 8, as an embodiment, an available spatial (mvp) candidate may be inserted into a prediction candidate list (mvp candidate list) by searching a spatial neighboring block for motion vector prediction (S810). In this case, candidates can be derived by dividing the neighboring blocks into two groups. For example, one (mvp) candidate is derived from group A including the bottom-left corner neighboring block A0 and the left neighboring block A1 of the current block, and one (mvp) candidate is derived from group B including the top-right corner neighboring block B0, the top neighboring block B1, and the top-left corner neighboring block B2. The mvp candidate derived from the group A may be called mvpA, and the mvp candidate derived from the group B may be called mvpB. If all neighboring blocks in the group are not available or are intra-coded, an (mvp) candidate may not be derived from the group.

Thereafter, as an embodiment, it is determined whether the number of spatial candidates is less than two (S820). For example, according to an embodiment, when the number of spatial candidates is less than 2, temporal candidates derived by searching temporal neighboring blocks may be additionally inserted into the prediction candidate list (S630). A temporal candidate derived from the temporal neighboring block may be called mvpCol.

Meanwhile, when the MVP mode is applied, the reference picture index may be explicitly signaled. In this case, a reference picture index for L0 prediction (refidxL0) and a reference picture index for L1 prediction (refidxL1) may be separately signaled. For example, when the MVP mode is applied and bi-prediction is applied, both the information on the refidxL0 and the information on the refidxL1 may be signaled.

When bi-prediction is applied, an mvp candidate list for deriving L0 motion information and an mvp candidate list for deriving L1 motion information may be separately generated and used. Above-described information (or information on prediction) may include selection information (e.g., an MVP flag or an MVP index) indicating an optimal motion vector predictor candidate selected from among the motion vector predictor candidates included in the list. In this case, the predictor may select a motion vector predictor of the current block from among the motion vector predictor candidates included in the motion vector candidate list by using the selection information. The predictor of the encoding apparatus may obtain a motion vector difference (MVD) between a motion vector of a current block and a motion vector predictor, and may encode the MVD and output the encoded MVD in the form of a bitstream. That is, the MVD may be obtained by subtracting the motion vector predictor from the motion vector of the current block. In this case, the predictor of the decoding apparatus may obtain the motion vector difference included in the information on prediction, and derive the motion vector of the current block by adding the motion vector difference and the motion vector predictor. The predictor of the decoding apparatus may obtain or derive a reference picture index or the like indicating a reference picture from the information on prediction.

When the MVP mode is applied, as described above, information about the MVD derived from the encoding apparatus may be signaled to the decoding apparatus. The information on the MVD may include, for example, information indicating the absolute value of the MVD and the x and y components of the sign. In this case, information indicating whether the MVD absolute value is greater than 0, whether the MVD absolute value is greater than 1, and the MVD remainder may be signaled stepwisely. For example, information indicating whether the MVD absolute value is greater than 1 may be signaled only when the value of flag information indicating whether the MVD absolute value is greater than 0 is 1.

For example, the information on the MVD may be configured in the syntax shown in Table 1, encoded by the encoding apparatus, and signaled to the decoding apparatus.

TABLE 1

| | Descriptor |
|---|---|
| mvd_coding( x0, y0, refList ,cpIdx ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

For example, in Table 1, the abs_mvd_greater0_flag syntax element may indicate information on whether the difference MVD is greater than 0, and the abs_mvd_greater1_flag syntax element may indicate information on whether the difference MVD is greater than 1. Also, the abs_mvd_minus2 syntax element may indicate information about a value obtained by minusing 2 from the difference MVD, and the mvd_sign_flag syntax element may indicate information about the sign of the difference MVD. Also, in Table 1, [0] of each syntax element may indicate that it is of information on L0, and [1] may indicate that it is of information on L1.

For example, MVD[compIdx] may be derived based on abs_mvd_greater0_flag[compIdx]*(abs_mvd_minus2[compIdx]+2)*(1−2*mvd_sign_flag[compIdx]). Here, compIdx (or cpIdx) indicates an index of each component, and may have a value of 0 or 1. compIdx 0 may indicate the x component, and compIdx 1 may indicate the y component. However, this is an example, and a value for each component may be expressed using a coordinate system other than the x and y coordinate system.

Meanwhile, MVD for L0 prediction (MVDL0) and MVD for L1 prediction (MVDL1) may be separately signaled, and the information on the MVD may include information on MVDL0 and/or information on MVDL1. For example, when the MVP mode is applied to the current block and BI prediction is applied, both the information on the MVDLO and the information on the MVDL1 may be signaled.

Figure 9:
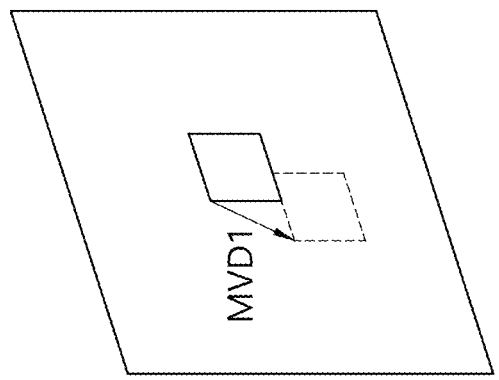
FIG. 9 is a diagram for explaining a symmetric MVD.
Figure 9:
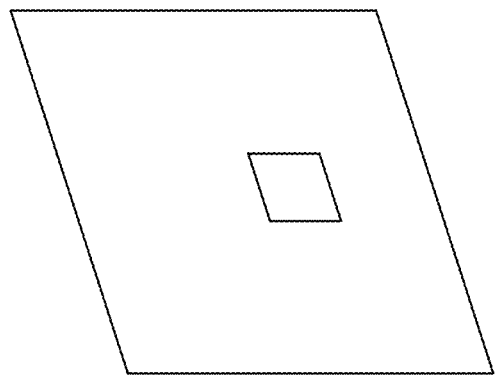
Figure 9:
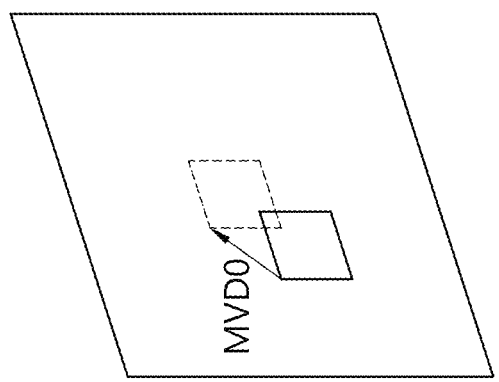

FIG. 9 is a diagram for explaining a symmetric MVD.

Meanwhile, when bi-prediction (BI prediction) is applied, symmetric MVD may be used in consideration of coding efficiency. Here, the symmetric MVD may be referred to as an SMVD. In this case, signaling of some of the motion information may be omitted. For example, when symmetric MVD is applied to the current block, information on refidxL0, information on refidxL1, and information on MVDL1 are not signaled from the encoding apparatus to the decoding apparatus, but may be internally derived. For example, when MVP mode and BI prediction are applied to the current block, flag information indicating whether symmetric MVD is applied (e.g., symmetric MVD flag information or sym_mvd_flag syntax element) may be signaled, while, when the value of the flag information is 1, the decoding apparatus may determine that symmetric MVD is applied to the current block.

When the symmetric MVD mode is applied (that is, when the value of the symmetric MVD flag information is 1), information about MVDL0 and mvp_l0_flag, mvp_l1_flag may be explicitly signaled, and as described above, signaling of information on refidxL0, information on refidxL1, and information on MVDL1 may be omitted and internally derived. For example, refidxL0 may be derived as an index indicating a previous reference picture closest to the current picture in POC order in reference picture list 0 (which may be referred to as list 0 or L0). refidxL1 may be derived as an index indicating a subsequent reference picture closest to the current picture in POC order in reference picture list 1 (which may be referred to as list 1 or L1). Or, for example, refidxL0 and refidxL1 may both be derived as 0, respectively. Alternatively, for example, the refidxL0 and refidxL1 may be derived as minimum indexes having the same POC difference in relation to the current picture, respectively. Specifically, for example, when it is assumed that [POC of the current picture]–[POC of the first reference picture indicated by refidxL0] is the first POC difference, and that [POC of the second reference picture indicated by refidxL1] is the second POC difference, and only when the first POC difference and the second POC difference are the same, the value of refidxL0 indicating the first reference picture is derived as the value of refidxL0 of the current block, and the value of refidxL1 indicating the second reference picture may be derived as the value of refidxL1 of the current block. Also, for example, when there is a plurality of sets where the first POC difference being equal to the second POC difference, refidxL0 and refidxL1 of one of the sets, which has the smallest difference may be derived as refidxL0 and refidxL1 of the current block. When the symmetric MVD mode is applied, the refidxL0 and refidxL1 may be referred to as RefIdxSymL0 and RefIdxSymL1, respectively. For example, RefIdxSymL0 and RefIdxSymL1 may be determined in units of slices. In this case, blocks to which SMVD is applied in the current slice may use the same RefIdxSymL0 and RefIdxSymL1.

MVDL1 may be derived as –MVDL0. For example, the final MV for the current block may be derived as in Equation 1.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \quad [\text{Equation 1}]$$

In Equation 1, $mvx_0$ and $mvy_0$ may represent an x component and a y component of a motion vector for L0 motion information or L0 prediction, and $mvx_1$ and $mvy_1$ may represent an x component and a y component of a motion vector for L1 motion information or L1 prediction. Also, $mvpx_0$ and $mvpy_0$ may indicate the x component and y component of the motion vector predictor for L0 prediction, and $mvpx_1$ and $mvpy_1$ may indicate the x component and y component of the motion vector predictor for L1 prediction. Also, $mvdx_0$ and $mvdy_0$ may indicate an x component and a y component of a motion vector difference for L0 prediction.

Meanwhile, a predicted block for the current block may be derived based on the motion information derived according to the prediction mode. The predicted block may include prediction samples (prediction sample array) of the current block. When the motion vector of the current block indicates a fractional sample unit, an interpolation procedure may be performed, and through this, prediction samples of the current block may be derived based on reference samples of the fractional sample unit in the reference picture. When affine inter prediction is applied to the current block, prediction samples may be generated based on the sample/subblock unit MV. When bi-prediction is applied, prediction samples derived through weighted sum (according to phase) or weighted average of prediction samples derived based on L0 prediction (i.e., prediction using a reference picture and MVL0 in the reference picture list L0) and prediction samples derived based on L1 prediction (i.e., prediction using the reference picture and MVL1 in the reference picture list L1) may be used as prediction samples of the current block. When bi-prediction is applied, and when the reference picture used for L0 prediction and the reference picture used for L1 prediction are located in different temporal directions with respect to the current picture (i.e., in the case corresponding to bi-prediction and bi-directional), this may be referred to as true bi-prediction.

As described above, reconstructed samples and reconstructed pictures may be generated based on the derived prediction samples, and then procedures such as in-loop filtering may be performed.

Meanwhile, referring back to the configuration related to symmetric MVD (SMVD), a symmetric MVD flag is signaled only for a block to which pair prediction is applied, and if the symmetric MVD flag is true, only MVD for L0 may be signaled, and the MVD for L1 may be used by mirroring the MVD signaled for L0. However, in this case, a problem may occur depending on the value of the mvd_l1_zero_flag syntax element (e.g., when the mvd_l1_zero_flag syntax element is true) during the process of applying the symmetric MVD.

For example, the mvd_l1_zero_flag syntax element may be signaled based on the syntax shown in Tables 2 to 4. That is, when the current slice in the slice header is a B slice, the mvd_l1_zero_flag syntax element may be signaled. Here, Tables 2 to 4 may represent one syntax (e.g., slice header syntax) continuously.

TABLE 2

| | Descriptor |
| --- | --- |
| slice_header( ) { | |
|   slice_pic_parameter_set_id | ue(v) |
|   if( rect_slice_flag \| \| NumBricksInPic > 1 ) | |
|     slice_address | u(v) |
|   if( !rect_slice_flag && !single_brick_per_slice_flag ) | |
|     num_bricks_in_slice_minus1 | ue(v) |
|   slice_type | ue(v) |
|   if( NalUnitType = = GRA_NUT ) | |
|     recovery_poc_cnt | se(v) |

TABLE 2-continued

| | Descriptor |
|---|---|
| slice_pic_order_cnt_lsb | u(v) |
| if( NalUnitType = = IDR_W_RADL \|\| NalUnitType = = IDR_N_LP \|\| | |
|     NalUnitType = = CRA_NUT ) | |
|     no_output_of_prior_pics_flag | u(1) |
| if( output_flag_present_flag ) | |
|     pic_output_flag | u(1) |
| if( ( NalUnitType != IDR_W_RADL && NalUnitType != IDR_N_LP ) \|\| | |
|     sps_idr_rpl_present_flag ) { | |
|     for( i = 0; i < 2; i++ ) { | |
|         if( num_ref_pic_lists_in_sps[ i ] > 0 && | |
|                 ( i = = 0 \|\| ( i = = 1 && rpl1_idx_present_flag ) ) ) | |
|             ref_pic_list_sps_flag[ i ] | u(1) |
|         if( ref_pic_list_sps_flag[ i ] ) { | |
|             if( num_ref_pic_lists_in_sps[ i ] > 1 && | |
|                     ( i = = 0 \|\| ( i = = 1 && rpl1_idx_present_flag ) ) ) | |
|                 ref_pic_list_idx[ i ] | u(v) |
|         } else | |
|             ref_pic_list_struct( i, num_ref_pic_lists_in_sps[ i ] ) | |
|         for( j = 0; j < NumLtrpEntries[ i ][ RplsIdx[ i ] ]; j++ ) { | |
|             if( ltrp_in_slice_header_flag[ i ][ RplsIdx[ i ] ] ) | |
|                 slice_poc_lsb_lt[ i ][ j ] | u(v) |
|             delta_poc_msb_present_flag[ i ][ j ] | u(1) |
|             if( delta_poc_msb_present_flag[ i ][ j ] ) | |
|                 delta_poc_msb_cycle_lt[ i ][ j ] | ue(v) |
|         } | |
|     } | |
|     if( ( slice_type != I && num_ref_entries[ 0 ][ RplsIdx[ 0 ] ] > 1 ) \|\| | |
|         ( slice_type = = B && num_ref_entries[ 1 ][ RplsIdx[ 1 ] ] > 1 ) ) { | |
|         num_ref_idx_active_override_flag | u(1) |
|         if( num_ref_idx_active_override_flag ) | |
|             for( i = 0; i < ( slice_type = = B ? 2: 1 ); i++) | |
|                 if( num_ref_entries[ i ][ RplsIdx[ i ] ] > 1 ) | |
|                     num_ref_idx_active_minus1[ i ] | ue(v) |
|     } | |
| } | |
| if( partition_constraints_override_enabled_flag ) { | |
|     partition_constraints_override_flag | ue(v) |
|     if( partition_constraints_override_flag ) { | |

TABLE 3

| | Descriptor |
|---|---|
| slice_log2_diff_min_qt_min_cb_luma | ue(v) |
| slice_max_mtt_hierarchy_depth_luma | ue(v) |
| if( slice_max_mtt_hierarchy_depth_luma != 0 ) | |
|     slice_log2_diff_max_bt_min_qt_luma | ue(v) |
|     slice_log2_diff_max_tt_min_qt_luma | ue(v) |
| } | |
| if( slice_type = = I && qtbtt_dual_tree_intra_flag ) { | |
|     slice_log2_diff_min_qt_min_cb_chroma | ue(v) |
|     slice_max_mtt_hierarchy_depth_chroma | ue(v) |
|     if( slice_max_mtt_hierarchy_depth_chroma != 0 ) | |
|         slice_log2_diff_max_bt_min_qt_chroma | ue(v) |
|         slice_log2_diff_max_tt_min_qt_chroma | ue(v) |
|     } | |
| } | |
| } | |
| if( slice_type != I ) { | |
|     if( sps_temporal_mvp_enabled_flag ) | |
|         slice_temporal_mvp_enabled_flag | u(1) |
|     if( slice_type = = B ) | |
|         mvd_l1_zero_flag | u(1) |
|     if( cabac_init_present_flag ) | |
|         cabac_init_flag | u(1) |
|     if( slice_temporal_mvp_enabled_flag ) { | |
|         if( slice_type = = B ) | |
|             collocated_from_l0_flag | u(1) |
|     } | |
|     if( ( weighted_pred_flag && slice_type = = P ) \|\| | |
|         ( weighted_bipred_flag && slice_type = = B ) ) | |
|         pred_weight_table( ) | |
| six_minus_max_num_merge_cand | ue(v) |
| if( sps_affine_enabled_flag ) | |
|     five_minus_max_num_subblock_merge_cand | ue(v) |
| if( sps_fpel_mmvd_enabled_flag ) | |
|     slice_fpel_mmvd_enabled_flag | u(1) |
| if( sps_triangle_enabled_flag && MaxNumMergeCand >= 2 ) | |
|     max_num_merge_cand_minus_max_num_triangle_cand | ue(v) |
| } else if ( sps_ibc_enabled_flag ) | |
|     six_minus_max_num_merge_cand | ue(v) |
| slice_qp_delta | se(v) |
| if( pps_slice_chroma_qp_offsets_present_flag ) { | |
|     slice_cb_qp_offset | se(v) |
|     slice_cr_qp_offset | se(v) |
| } | |
| if( sps_sao_enabled_flag ) { | |
|     slice_sao_luma_flag | u(1) |
|     if( ChromaArrayType != 0 ) | |
|         slice_sao_chroma_flag | u(1) |

TABLE 4

```
}
if( sps_alf_enabled_flag ) {
    slice_alf_enabled_flag                                              u(1)
    if( slice_alf_enabled_flag ) {
        num_alf_aps_ids                                                 tb(v)
        for( i = 0; i < num_alf_aps_ids; i++ )
            slice_alf_aps_id_luma[ i ]                                  u(5)
        slice_alf_chroma_idc                                            tu(v)
        if( slice_alf_chroma_idc && ( slice_type != I | | num_alf_aps_ids != 1 ) )
            slice_alf_aps_id_chroma                                     u(5)
    }
}
dep_quant_enabled_flag                                                  u(1)
if( !dep_quant_enabled_flag )
    sign_data_hiding_enabled_flag                                       u(1)
if( deblocking_filter_override_enabled_flag )
    deblocking_filter_override_flag                                     u(1)
if( deblocking_filter_override_flag ) {
    slice_deblocking_filter_disabled_flag                               u(1)
    if( !slice_deblocking_filter_disabled_flag ) {
        slice_beta_offset_div2                                          se(v)
        slice_tc_offset_div2                                            se(v)
    }
}
if( sps_lmcs_enabled_flag ) {
    slice_lmcs_enabled_flag                                             u(1)
    if( slice_lmcs_enabled_flag ) {
        slice_lmcs_aps_id                                               u(5)
        if( !( qtbtt_dual_tree_intra_flag && slice_type == I ) )
            slice_chroma_residual_scale_flag                            u(1)
    }
}
if ( entropy_coding_sync_enabled_flag )
    num_entry_point_offsets                                             ue(v)
if( NumEntryPoints > 0 ) {
    offset_len_minus1                                                   ue(v)
    for( i = 0; i < NumEntryPoints; i++ )
        entry_point_offset_minus1[ i ]                                  u(v)
}
byte_alignment( )
}
```

For example, semantics of the mvd_l1_zero_flag syntax element in Tables 2 to 4 may be as shown in Table 5 below.

TABLE 5 mvd_l1_zero_flag equal to 1 indicates that the mvd_coding( x0, y0, 1 ) syntax structure is not parsed and MvdL1[ x0 ][ y0 ][ compIdx ] is set equal to 0 for compIdx = 0..1. mvd_l1_zero_flag equal to 0 indicates that the mvd_coding( x0, y0, 1 ) syntax structure is parsed.

Alternatively, for example, the mvd_l1_zero_flag syntax element may indicate information on whether the mvd_coding syntax for L1 prediction is parsed. For example, when the mvd_l1_zero_flag syntax element has a value of 1, it may indicate that the mvd_coding syntax according to L1 prediction is not parsed, and that the MvdL1 value is determined to be 0. Alternatively, for example, when the mvd_l1_zero_flag syntax element has a value of 0, it may indicate that the mvd_coding syntax according to L1 prediction is parsed. That is, the MvdL1 value may be determined according to the mvd_l1_zero_flag syntax element.

For example, a decoding procedure of symmetric motion vector difference reference indices may be as shown in Table 6 below, but is not limited thereto. For example, the symmetric MVD reference index for L0 prediction may be represented as RefIdxSymL0, and the symmetric MVD reference index for L1 prediction may be represented as RefIdxSymL1.

TABLE 6

1.1.1 Decoding process for symmetric motion vector difference reference indices

Output of this process are RefIdxSymL0 and RefIdxSymL1 specifying the list 0 and list 1 reference picture indices for symmetric motion vector differences, i.e., when sym_mvd_flag is equal to 1 for a coding unit.
The variable RefIdxSymLX with X being 0 and 1 is derived as follows:
- The variable currPic specifies the current picture.
- RefIdxSymL0 is set equal to −1.
- For each index i with i = 0..NumRefIdxActive[ 0 ] − 1, the following applies:
  - When all of the following conditions are true, RefIdxSymL0 is set to i:
    - DiffPicOrderCnt( currPic, RefPicList[ 0 ][ i ] ) > 0,
    - DiffPicOrderCnt( currPic, RefPicList[ 0 ][ i ] ) <
      DiffPicOrderCnt( currPic, RefPicList[ 0 ][ RefIdxSymL0 ] ) or RefIdxSymL0 is equal to −1.

TABLE 6-continued 1.1.1 Decoding process for symmetric motion vector difference reference indices

- RefIdxSymL1 is set equal to −1.
- For each index i with i = 0..NumRefIdxActive[ 1 ] − 1, the following applies:
  - When all of the following conditions are true, RefIdxSymL1 is set to i:
    - DiffPicOrderCnt( currPic, RefPicList[ 1 ][ i ] ) < 0,
    - DiffPicOrderCnt( currPic, RefPicList[ 1 ][ i ] ) >
      DiffPicOrderCnt( currPic, RefPicList[ 1 ][ RefIdxSymL1 ] ) or RefIdxSymL1 is equal to −1.
- When RefIdxSymL0 is equal to −1 or RefIdxSymL1 is equal to −1, the following applies:
  - For each index i with i = 0..NumRefIdxActive[ 0 ] − 1, the following applies:
    - When all of the following conditions are true, RefIdxSymL0 is set to i:
      - DiffPicOrderCnt( currPic, RefPicList[ 0 ][ i ] ) < 0,
      - DiffPicOrderCnt( currPic, RefPicList[ 0 ][ i ] ) >
        DiffPicOrderCnt( currPic, RefPicList[ 0 ][ RefIdxSymL0 ] ) or RefIdxSymL0 is equal to
        −1.
  - For each index i with i = 0..NumRefIdxActive[ 1 ] − 1, the following applies:
    - When all of the following conditions are true, RefIdxSymL1 is set to i:
      - DiffPicOrderCnt( currPic, RefPicList[ 1 ][ i ] ) > 0,
      - DiffPicOrderCnt( currPic, RefPicList[ 1 ][ i ] ) <
        DiffPicOrderCnt( currPic, RefPicList[ 1 ][ RefIdxSymL1 ] ) or RefIdxSymL1 is equal to
        −1.

For example, information on symmetric MVD, or a sym_mvd_flag syntax element may be signaled based on the syntaxes shown in Tables 7 to 10 below. Here. Tables 7 to 10 may represent one syntax (e.g., coding unit syntaxes) continuously.

TABLE 7

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA && | |
|     !( cbWidth = = 4 && cbHeight = = 4 && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|     && !( cbWidth = = 4 && cbHeight = = 4 ) ) | |
|       pred_mode_flag | ae(v) |
|     if( ( ( slice_type = = I && cu_skip_flag[ x0 ][ y0 ] = =0 ) \|\| | |
|     ( slice_type != I && ( CuPredMode[ x0 ][ y0 ] != MODE_INTRA \|\| | |
|     ( cbWidth = = 4 && cbHeight = = 4 && cu_skip_flag[ x0 ][ y0 ] = = 0 ) ) ) ) && | |
|     sps_ibc_enabled_flag && ( cbWidth != 128 \|\| cbHeight != 128 ) ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|     cbWidth >= MinIpcmCbSizeY && cbWidth <= MaxIpcmCbSizeY && | |
|     cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] = = 0 && | |
|         ( cbWidth <= MaxTbSizeY \|\| cbHeight <= MaxTbSizeY ) && | |
|         ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] = = 1 && | |
|         cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && | |
|         intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType = = SINGLE_TREE \|\| treeType = = DUAL_TREE_CHROMA ) | |

TABLE 7-continued

| | Descriptor |
|---|---|
|     intra_chroma_pred_mode[ x0 ][ y0 ]<br>  }<br>} else if( treeType != DUAL_TREE_CHROMA ) { /* MODE_INTER or MODE_IBC */<br>  if( cu_skip_flag[ x0 ][ y0 ] = = 0 )<br>    general_merge_flag[ x0 ][ y0 ]<br>  if( general_merge_flag[ x0 ][ y0 ] ) {<br>    merge_data( x0, y0, cbWidth, cbHeight ) | ae(v)<br><br><br><br>ae(v) |

TABLE 8

```
} else if ( CuPredMode[ x0 ][ y0 ] = = MODE_IBC ) {
    mvd_coding( x0, y0, 0, 0 )
    mvp_l0_flag[ x0 ][ y0 ]                                                          ae(v)
    if( sps_amvr_enabled_flag &&
      ( MvdL0[ x0 ][ y0 ][ 0 ] != 0 || MvdL0[ x0 ][ y0 ][ 1 ] != 0 ) ) {
      amvr_precision_flag[ x0 ][ y0 ]                                                ae(v)
    }
} else {
    if( slice_type = = B )
      inter_pred_idc[ x0 ][ y0 ]                                                     ae(v)
    if( sps_affine_enabled_flag && cbWidth >= 16 && cbHeight >= 16 ) {
      inter_affine_flag[ x0 ][ y0 ]                                                  ae(v)
      if( sps_affine_type_flag && inter_affine_flag[ x0 ][ y0 ] )
        cu_affine_type_flag[ x0 ][ y0 ]                                              ae(v)
    }
    if( sps_smvd_enabled_flag && inter_pred_idc[ x0 ][ y0 ] = = PRED_BI &&
        !inter_affine_flag[ x0 ][ y0 ] && RefIdxSymL0 > -1 && RefIdxSymL1 > -1 )
      sym_mvd_flag[ x0 ][ y0 ]                                                       ae(v)
    if( inter_pred_idc[ x0 ][ y0 ] != PRED_L1 ) {
      if( NumRefIdxActive[ 0 ] > 1 && !sym_mvd_flag[ x0 ][ y0 ] )
        ref_idx_l0[ x0 ][ y0 ]                                                       ae(v)
      mvd_coding( x0, y0, 0, 0 )
      if( MotionModelIdc[ x0 ][ y0 ] > 0 )
        mvd_coding( x0, y0, 0, 1 )
      if(MotionModelIdc[ x0 ][ y0 ] > 1 )
        mvd_coding( x0, y0, 0, 2 )
      mvp_l0_flag[ x0 ][ y0 ]                                                        ae(v)
    } else {
      MvdL0[ x0 ][ y0 ][ 0 ] = 0
      MvdL0[ x0 ][ y0 ][ 1 ] = 0
    }
    if( inter_pred_idc[ x0 ][ y0 ] != PRED_L0 ) {
      if( NumRefIdxActive[ 1 ] > 1 && !sym_mvd_flag[ x0 ][ y0 ] )
        ref_idx_l1[ x0 ][ y0 ]                                                       ae(v)
      if( mvd_l1_zero_flag && inter_pred_idc[ x0 ][ y0 ] = = PRED_BI ) {
        MvdL1[ x0 ][ y0 ][ 0 ] = 0
        MvdL1[ x0 ][ y0 ][ 1 ] = 0
        MvdCpL1[ x0 ][ y0 ][ 0 ][ 0 ] = 0
        MvdCpL1[ x0 ][ y0 ][ 0 ][ 1 ] = 0
        MvdCpL1[ x0 ][ y0 ][ 1 ][ 0 ] = 0
        MvdCpL1[ x0 ][ y0 ][ 1 ][ 1 ] = 0
        MvdCpL1[ x0 ][ y0 ][ 2 ][ 0 ] = 0
        MvdCpL1[ x0 ][ y0 ][ 2 ][ 1 ] = 0
      } else {
        if( sym_mvd_flag[ x0 ][ y0 ] ) {
          MvdL1[ x0 ][ y0 ][ 0 ] = -MvdL0[ x0 ][ y0 ][ 0 ]
          MvdL1[ x0 ][ y0 ][ 1 ] = -MvdL0[ x0 ][ y0 ][ 1 ]
        } else
```

TABLE 9

```
        mvd_coding( x0, y0, 1, 0 )
        if( MotionModelIdc[ x0 ][ y0 ] > 0 )
          mvd_coding( x0, y0, 1, 1 )
        if(MotionModelIdc[ x0 ][ y0 ] > 1 )
          mvd_coding( x0, y0, 1, 2 )
        mvp_l1_flag[ x0 ][ y0 ]                                                      ae(v)
      }
    } else {
```

TABLE 9-continued

```
        MvdL1[ x0 ][ y0 ][ 0 ] = 0
        MvdL1[ x0 ][ y0 ][ 1 ] = 0
    }
    if( ( sps_amvr_enabled_flag && inter_affine_flag[ x0 ][ y0 ] = = 0 &&
        ( MvdL0[ x0 ][ y0 ][ 0 ] != 0 || MvdL0[ x0 ][ y0 ][ 1 ] != 0 ||
          MvdL1[ x0 ][ y0 ][ 0 ] != 0 || MvdL1[ x0 ][ y0 ][ 1 ] != 0 ) ) ||
        ( sps_affnie_amvr_enabled_flag && inter_affine_flag[ x0 ][ y0 ] = = 1
&&
        ( MvdCpL0[ x0 ][ y0 ][ 0 ] [ 0 ] != 0 || MvdCpL0[ x0 ][ y0 ][ 0 ] [ 1 ] != 0
||
          MvdCpL1[ x0 ][ y0 ][ 0 ] [ 0 ] != 0 || MvdCpL1[ x0 ][ y0 ][ 0 ] [ 1 ] != 0
||
          MvdCpL0[ x0 ][ y0 ][ 1 ] [ 0 ] != 0 || MvdCpL0[ x0 ][ y0 ][ 1 ] [ 1 ] != 0
||
          MvdCpL1[ x0 ][ y0 ][ 1 ] [ 0 ] != 0 || MvdCpL1[ x0 ][ y0 ][ 1 ] [ 1 ] != 0
||
          MvdCpL0[ x0 ][ y0 ][ 2 ] [ 0 ] != 0 || MvdCpL0[ x0 ][ y0 ][ 2 ] [ 1 ] != 0
||
          MvdCpL1[ x0 ][ y0 ][ 2 ] [ 0 ] != 0 || MvdCpL1[ x0 ][ y0 ][ 2 ] [ 1 ] !=
0 ) ) {
        amvr_flag[ x0 ][ y0 ]                                              ae(v)
        if( amvr_flag[ x0 ][ y0 ] )
            amvr_precision_flag[ x0 ][ y0 ]                                ae(v)
    }
    if( sps_bcw_enabled_flag && inter_pred_idc[ x0 ][ y0 ] = = PRED_BI &&
        luma_weight_l0_flag[ ref_idx_l0 [ x0 ][ y0 ] ] = = 0 &&
        luma_weight_l1_flag[ ref_idx_l1 [ x0 ][ y0 ] ] = = 0 &&
        chroma_weight_l0_flag[ ref_idx_l0 [ x0 ][ y0 ] ] = = 0 &&
        chroma_weight_l1_flag[ ref_idx_l1 [ x0 ][ y0 ] ] = = 0 &&
        cbWidth * cbHeight >= 256 )
        bcw_idx[ x0 ][ y0 ]                                                ae(v)
    }
}
if( !pcm_flag[ x0 ][ y0 ] ) {
    if( CuPredMode[ x0 ][ y0 ] != MODE_INTRA &&
        general_merge_flag[ x0 ][ y0 ] = = 0 )
        cu_cbf                                                             ae(v)
```

TABLE 10

```
if( cu_cbf ) {
    if( CuPredMode[ x0 ][ y0 ] = = MODE_INTER && sps_sbt_enabled_flag
&&
        !ciip_flag[ x0 ][ y0 ] && !MergeTriangleFlag[ x0 ][ y0 ] ) {
        if( cbWidth <= MaxSbtSize && cbHeight <= MaxSbtSize ) {
            allowSbtVerH = cbWidth >= 8
            allowSbtVerQ = cbWidth >= 16
            allowSbtHorH = cbHeight >= 8
            allowSbtHorQ = cbHeight >= 16
            if( allowSbtVerH || allowSbtHorH || allowSbtVerQ ||
allowSbtHorQ )
                cu_sbt_flag                                                ae(v)
        }
        if( cu_sbt_flag ) {
            if( ( allowSbtVerH || allowSbtHorH ) && ( allowSbtVerQ ||
allowSbtHorQ) )
                cu_sbt_quad_flag                                           ae(v)
            if( ( cu_sbt_quad_flag && allowSbtVerQ && allowSbtHorQ ) ||
                ( !cu_sbt_quad_flag && allowSbtVerH && allowSbtHorH ) )
                cu_sbt_horizontal_flag                                     ae(v)
            cu_sbt_pos_flag                                                ae(v)
        }
    }
    transform_tree( x0, y0, cbWidth, cbHeight, treeType )
  }
 }
}
```

Alternatively, for example, information on symmetric MVD, or a sym_mvd_flag syntax element may be signaled based on the syntaxes shown in Tables 11 to 15 below. Here, Tables 11 to 15 may represent one syntax (e.g., coding unit syntax) continuously.

TABLE 11

| | Descriptor |
|---|---|
| coding_unit( x0, y0, cbWidth, cbHeight, cqtDepth, treeType, modeType ) { <br>  if( sh_slice_type = = I && ( cbWidth > 64 ‖ cbHeight > 64 ) ) <br>    modeType = MODE_TYPE_INTRA <br>  chType = treeType = = DUAL_TREE_CHROMA ? 1 : 0 <br>  if( sh_slice_type != I ‖ sps_ibc_enabled_flag ) { <br>    if( treeType != DUAL_TREE_CHROMA && <br>      ( ( !( cbWidth = = 4 && cbHeight = = 4 ) && <br>      modeType != MODE_TYPE_INTRA ) ‖ <br>      ( sps_ibc_enabled_flag && cbWidth <= 64 && cbHeight <= 64 ) ) ) <br>      cu_skip_flag[ x0 ][ y0 ] | ae(v) |
|     if( cu_skip_flag[ x0 ][ y0 ] = = 0 && sh_slice_type != I && <br>      !( cbWidth = = 4 && cbHeight = = 4 ) && modeType = = MODE_TYPE_ALL ) <br>      pred_mode_flag | ae(v) |
|     if( ( ( sh_slice_type = = I && cu_skip_flag[ x0 ][ y0 ] = =0 ) ‖ <br>      ( sh_slice_type != I && ( CuPredMode[ chType ][ x0 ][ y0 ] != MODE_INTRA ‖ <br>      ( ( ( cbWidth = = 4 && cbHeight = = 4 ) ‖ modeType = = MODE_TYPE_INTRA ) <br>      && cu_skip_flag[ x0 ][ y0 ] = = 0 ) ) ) ) && <br>      cbWidth <= 64 && cbHeight <= 64 && modeType != MODE_TYPE_INTER && <br>      sps_ibc_enabled_flag && treeType != DUAL_TREE_CHROMA ) <br>      pred_mode_ibc_flag | ae(v) |
|   } <br>  if( CuPredMode[ chType ][ x0 ][ y0 ] = = MODE_INTRA && sps_palette_enabled_flag && <br>    cbWidth <= 64 && cbHeight <= 64 && cu_skip_flag[ x0 ][ y0 ] = = 0 && <br>    modeType != MODE_TYPE_INTER && ( ( cbWidth * cbHeight ) > <br>    ( treeType != DUAL_TREE _CHROMA ? 16 : 16 * SubWidthC * SubHeightC ) ) && <br>    ( modeType != MODE_TYPE_INTRA ‖ treeType != DUAL_TREE_CHROMA ) ) <br>    pred_mode_plt_flag | ae(v) |
|   if( CuPredMode[ chType ][ x0 ][ y0 ] = = MODE_INTRA && sps_act_enabled_flag && <br>    treeType = = SINGLE_TREE ) <br>    cu_act_enabled_flag | ae(v) |
|   if( CuPredMode[ chType ][ x0 ][ y0 ] = = MODE _INTRA ‖ <br>    CuPredMode[ chType ][ x0 ] [ y0 ] = = MODE_PLT ) { <br>    if( treeType = = SINGLE_TREE ‖ treeType = = DUAL_TREE_LUMA ) { <br>      if( pred_mode_plt_flag ) <br>        palette_coding( x0, y0, cbWidth, cbHeight, treeType ) <br>      else { <br>        if( sps_bdpcm_enabled_flag && <br>          cbWidth <= MaxTsSize && cbHeight <= MaxTsSize ) <br>          intra_bdpcm_luma_flag | ae(v) |
|         if( intra_bdpcm_luma_flag ) <br>          intra_bdpcm_luma_dir_flag | ae(v) |
|         else { <br>          if( sps_mip_enabled_flag ) <br>            intra_mip_flag[ x0 ][ y0 ] | ae(v) |
|           if( intra_mip_flag[ x0 ][ y0 ] ) { <br>            intra_mip_transposed_flag[ x0 ][ y0 ] | ae(v) |
|             intra_mip_mode[ x0 ][ y0 ] | ae(v) |
|           } else { <br>            if( sps_mrl_enabled_flag && ( ( y0 % CtbSizeY ) > 0 ) ) <br>              intra_luma_ref_idx[ x0 ][ y0 ] | ae(v) |

TABLE 12

| | |
|---|---|
|     if( sps_isp_enabled_flag && intra_luma_ref_idx[ x0 ][ y0 ] = = 0 && <br>      ( cbWidth <= MaxTbSizeY && cbHeight <= MaxTbSizeY ) && <br>      ( cbWidth * cbHeight > MinTbSizeY * MinTbSizeY ) && <br>      !cu_act_enabled_flag ) <br>      intra_subpartitions_mode_flag[ x0 ][ y0 ] | ae(v) |
|     if( intra_subpartitions_mode_flag[ x0 ][ y0 ] = = 1 ) <br>      intra_subpartitions_split_flag[ x0 ][ y0 ] | ae(v) |
|     if( intra_luma_ref_idx[ x0 ][ y0 ] = = 0 ) <br>      intra_luma_mpm_flag[ x0 ][ y0 ] | ae(v) |
|     if( intra_luma_mpm_flag[ x0 ][ y0 ] ) { <br>      if( intra_luma_ref_idx[ x0 ][ y0 ] = = 0 ) <br>        intra_luma_not_planar_flag[ x0 ][ y0 ] | ae(v) |
|       if( intra_luma_not_planar_flag[ x0 ][ y0 ] ) | |

TABLE 12-continued

```
              intra_luma_mpm_idx[ x0 ][ y0 ]                              ae(v)
           } else
              intra_luma_mpm_remainder[ x0 ][ y0 ]                        ae(v)
          }
        }
      }
    }
  }
  if( ( treeType = = SINGLE_TREE || treeType = = DUAL_TREE_CHROMA ) &&
      ChromaArrayType != 0 ) {
    if( pred_mode_plt_flag && treeType = = DUAL_TREE_CHROMA )
      palette_coding( x0, y0, cbWidth / SubWidthC, cbHeight / SubHeightC, treeType )
    else if( !pred_mode_plt_flag ) {
      if( !cu_act_enabled_flag ) {
        if( cbWidth / SubWidthC <= MaxTsSize && cbHeight / SubHeightC <= MaxTsSize
            && sps_bdpcm_enabled_flag )
          intra_bdpcm_chroma_flag                                         ae(v)
        if( intra _bdpcm_chroma_flag )
          intra_bdpcm_chroma_dir_flag                                     ae(v)
        else {
          if( CclmEnabled )
            cclm_mode_flag                                                ae(v)
          if( cclm_mode_flag )
            cclm_mode_idx                                                 ae(v)
          else
            intra_chroma_pred_mode                                        ae(v)
        }
      }
    }
  }
} else if( treeType != DUAL_TREE_CHROMA ) { /* MODE_INTER or MODE_IBC */
  if( cu_skip_flag[ x0 ][ y0 ] = = 0 )
    general_merge_flag[ x0 ][ y0 ]                                        ae(v)
  if( general_merge_flag[ x0 ][ y0 ] )
    merge_data( x0, y0, cbWidth, cbHeight, chType )
  else if( CuPredMode[ chType ][ x0 ][ y0 ] = = MODE_IBC ) {
    mvd_coding( x0, y0, 0, 0 )
```

TABLE 13

```
    if( MaxNumIbcMergeCand > 1 )
      mvp_l0_flag[ x0 ][ y0 ]                                             ae(v)
    if( sps_amvr_enabled_flag &&
        ( MvdL0[ x0 ][ y0 ][ 0 ] != 0 || MvdL0[ x0 ][ y0 ][ 1 ] != 0 ) )
      amvr_precision_idx[ x0 ][ y0 ]                                      ae(v)
  } else {
    if( sh_slice_type = = B )
      inter_pred_idc[ x0 ][ y0 ]                                          ae(v)
    if( sps_affine_enabled_flag && cbWidth >= 16 && cbHeight >= 16 ) {
      inter_affine_flag[ x0 ][ y0 ]                                       ae(v)
      if( sps_affine_type_flag && inter_affine_flag[ x0 ][ y0 ] )
        cu_affine_type_flag[ x0 ][ y0 ]                                   ae(v)
    }
    if( sps_smvd_enabled_flag && !ph_mvd_l1_zero_flag &&
        inter_pred_idc[ x0 ][ y0 ] = = PRED_BI &&
        !inter_affine_flag[ x0 ][ y0 ] && RefIdxSymL0 > -1 && RefIdxSymL1 > -1 )
      sym_mvd_flag[ x0 ][ y0 ]                                            ae(v)
    if( inter_pred_idc[ x0 ][ y0 ] != PRED_L1 ) {
      if( NumRefIdxActive[ 0 ] > 1 && !sym_mvd_flag[ x0 ][ y0 ] )
        ref_idx_l0[ x0 ][ y0 ]                                            ae(v)
      mvd_coding( x0, y0, 0, 0 )
      if( MotionModelIdc[ x0 ][ y0 ] > 0 )
        mvd_coding( x0, y0, 0, 1 )
      if(MotionModelIdc[ x0 ][ y0 ] > 1 )
        mvd _coding( x0, y0, 0, 2 )
      mvp_l0_flag[ x0 ][ y0 ]                                             ae(v)
    } else {
      MvdL0[ x0 ][ y0 ][ 0 ] = 0
      MvdL0[ x0 ][ y0 ][ 1 ] = 0
    }
    if( inter_pred_idc[ x0 ][ y0 ] != PRED_L0 ) {
      if( NumRefIdxActive[ 1 ] > 1 && !sym_mvd_flag[ x0 ][ y0 ] )
```

TABLE 13-continued

| | |
|---|---|
| ref_idx_l1[ x0 ][ y0 ] | ae(v) |
| if( ph_mvd_l1_zero_flag && inter_pred_idc[ x0 ][ y0 ] = = PRED_BI ) { | |
|   MvdL1[ x0 ][ y0 ][ 0 ] = 0 | |
|   MvdL1[ x0 ][ y0 ][ 1 ] = 0 | |
|   MvdCpL1[ x0 ][ y0 ][ 0 ][ 0 ] = 0 | |
|   MvdCpL1[ x0 ][ y0 ][ 0 ][ 1 ] = 0 | |
|   MvdCpL1[ x0 ][ y0 ][ 1 ][ 0 ] = 0 | |
|   MvdCpL1[ x0 ][ y0 ][ 1 ][ 1 ] = 0 | |
|   MvdCpL1[ x0 ][ y0 ][ 2 ][ 0 ] = 0 | |
|   MvdCpL1[ x0 ][ y0 ][ 2 ][ 1 ] = 0 | |
| } else { | |
|   if( sym_mvd_flag[ x0 ][ y0 ] ) { | |
|     MvdL1[ x0 ][ y0 ][ 0 ] = −MvdL0[ x0 ][ y0 ][ 0 ] | |
|     MvdL1[ x0 ][ y0 ][ 1 ] = −MvdL0[ x0 ][ y0 ][ 1 ] | |
|   } else | |
|     mvd_coding( x0, y0, 1, 0 ) | |
|   if( MotionModelIdc[ x0 ][ y0 ] > 0 ) | |

TABLE 14

| | |
|---|---|
|     mvd_coding( x0, y0, 1, 1 ) | |
|     if(MotionModelIdc[ x0 ][ y0 ] > 1 ) | |
|       mvd_coding( x0, y0, 1, 2 ) | |
|   } | |
|   mvp_l1_flag[ x0 ][ y0 ] | ae(v) |
| } else { | |
|   MvdL1[ x0 ][ y0 ][ 0 ] = 0 | |
|   MvdL1[ x0 ][ y0 ][ 1 ] = 0 | |
| } | |
| if( ( sps_amvr_enabled_flag && inter_affine_flag[ x0 ][ y0 ] = = 0 && | |
|   ( MvdL0[ x0 ][ y0 ][ 0 ] != 0 \|\| MvdL0[ x0 ][ y0 ][ 1 ] != 0 \|\| | |
|   MvdL1[ x0 ][ y0 ][ 0 ] != 0 \|\| MvdL1[ x0 ][ y0 ][ 1 ] != 0 ) ) \|\| | |
|   ( sps_affine_amvr_enabled_flag && inter_affine_flag[ x0 ][ y0 ] = = 1 && | |
|   ( MvdCpL0[ x0 ][ y0 ][ 0 ][ 0 ] != 0 \|\| MvdCpL0[ x0 ][ y0 ][ 0 ][ 1 ] != 0 \|\| | |
|   MvdCpL1[ x0 ][ y0 ][ 0 ][ 0 ] != 0 \|\| MvdCpL1[ x0 ] [ y0 ][ 0 ][ 1 ] != 0 \|\| | |
|   MvdCpL0[ x0 ][ y0 ][ 1 ][ 0 ] != 0 \|\| MvdCpL0[ x0 ][ y0 ][ 1 ][ 1 ] != 0 \|\| | |
|   MvdCpL1[ x0 ][ y0 ][ 1 ][ 0 ] != 0 \|\| MvdCpL1[ x0 ][ y0 ][ 1 ][ 1 ] != 0 \|\| | |
|   MvdCpL0[ x0 ][ y0 ][ 2 ][ 0 ] != 0 \|\| MvdCpL0[ x0 ][ y0 ][ 2 ][ 1 ] != 0 \|\| | |
|   MvdCpL1[ x0 ][ y0 ][ 2 ][ 0 ] != 0 \|\| MvdCpL1[ x0 ][ y0 ][ 2 ][ 1 ] != 0 ) ) { | |
|   amvr_flag[ x0 ][ y0 ] | ae(v) |
|   if( amvr_flag[ x0 ][ y0 ] ) | |
|     amvr_precision_idx[ x0 ][ y0 ] | ae(v) |
| } | |
| if( sps_bcw_enabled_flag && inter_pred_idc[ x0 ][ y0 ] = = PRED_BI && | |
|   luma_weight_l0_flag[ ref_idx_l0 [ x0 ][ y0 ] ] = = 0 && | |
|   luma_weight_l1_flag[ ref_idx_l1 [ x0 ][ y0 ] ] = = 0 && | |
|   chroma_weight_l0_flag[ ref_idx_l0 [ x0 ][ y0 ] ] = = 0 && | |
|   chroma_weight_l1_flag[ ref_idx_l1 [ x0 ][ y0 ] ] = = 0 && | |
|   cbWidth * cbHeight >= 256 ) | |
|   bcw_idx[ x0 ][ y0 ] | ae(v) |
| } | |
| } | |
| if( CuPredMode[ chType ][ x0 ][ y0 ] != MODE_INTRA && !pred_mode_plt_flag && | |
|   general_merge_flag[ x0 ][ y0 ] = = 0 ) | |
| cu_coded_flag | ae(v) |
| if( cu_coded_flag ) { | |
|   if( CuPredMode[ chType ][ x0 ][ y0 ] = = MODE _INTER && sps_sbt_enabled_flag && | |
|   !ciip_flag[ x0 ][ y0 ] && cbWidth <= MaxTbSizeY && cbHeight <= MaxTbSizeY ) { | |
|   allowSbtVerH = cbWidth >= 8 | |
|   allowSbtVerQ = cbWidth >= 16 | |
|   allowSbtHorH = cbHeight >= 8 | |
|   allowSbtHorQ = cbHeight >= 16 | |
|   if( allowSbtVerH \|\| allowSbtHorH ) | |
|     cu_sbt_flag | ae(v) |
|   if( cu_sbt_flag ) { | |
|     if( ( allowSbtVerH \|\| allowSbtHorH ) && ( allowSbtVerQ \|\| allowSbtHorQ ) ) | |
|       cu_sbt_quad_flag | ae(v) |
|     if( ( cu_sbt_quad_flag && allowSbtVerQ && allowSbtHorQ ) \|\| | |
|       ( !cu_sbt_quad_flag && allowSbtVerH && allowSbtHorH ) ) | |
|       cu_sbt_horizontal_flag | ae(v) |
|     cu_sbt_pos_flag | ae(v) |
|   } | |
| } | |

TABLE 15

```
if( sps_act_enabled_flag && CuPredMode[ chType ][ x0 ][ y0 ] != MODE_INTRA &&
      treeType = = SINGLE_TREE )
   cu_act_enabled_flag                                                                ae(v)
LfnstDcOnly = 1
LfnstZeroOutSigCoeffFlag = 1
MtsDcOnly = 1
MtsZeroOutSigCoeffFlag = 1
transform_tree( x0, y0, cbWidth, cbHeight, treeType, chType )
lfnstWidth = ( treeType = = DUAL_TREE_CHROMA ) ? cbWidth / SubWidthC :
      ( ( IntraSubPartitionsSplitType = = ISP_VER_SPLIT ) ?
         cbWidth / NumIntraSubPartitions : cbWidth )
lfnstHeight = ( treeType = = DUAL_TREE_CHROMA ) ? cbHeight / SubHeightC :
      ( ( IntraSubPartitionsSplitType = = ISP_HOR_SPLIT ) ?
         cbHeight / NumIntraSubPartitions : cbHeight )
lfnstNotTsFlag = ( treeType = = DUAL_TREE_CHROMA ||
         !tu_y_coded_flag[ x0 ][ y0 ] ||
         transform_skip_flag[ x0 ][ y0 ][ 0 ] = = 0 ) &&
      ( treeType = = DUAL_TREE_LUMA ||
         ( ( !tu_cb_coded_flag[ x0 ][ y0 ] ||
         transform_skip_flag[ x0 ][ y0 ][ 1 ] = = 0 ) &&
         ( !tu_cr_coded _flag[ x0 ][ y0 ] ||
         transform_skip_flag[ x0 ][ y0 ][ 2 ] = = 0 ) ) )
if( Min( lfnstWidth, lfnstHeight ) >= 4 && sps_lfnst_enabled_flag = = 1 &&
      CuPredMode[ chType ][ x0 ][ y0 ] = = MODE_INTRA && lfnstNotTsFlag = = 1 &&
      ( treeType = = DUAL_TREE_CHROMA || !intra_mip_flag[ x0 ][ y0 ] ||
         Min( lfnstWidth, lfnstHeight ) >= 16 ) &&
      Max( cbWidth, cbHeight ) <= MaxTbSizeY) {
   if( ( IntraSubPartitionsSplitType != ISP_NO_SPLIT || LfnstDcOnly = = 0 ) &&
         LfnstZeroOutSigCoeffFlag = = 1 )
      lfnst_idx                                                                       ae(v)
}
if( treeType != DUAL_TREE_CHROMA && lfnst_idx = = 0 &&
      transform_skip_flag[ x0 ][ y0 ][ 0 ] = = 0 && Max( cbWidth, cbHeight ) <= 32 &&
      IntraSubPartitionsSplitType = = ISP_NO_SPLIT && cu_sbt_flag = = 0 &&
      MtsZeroOutSigCoeffFlag = = 1 && MtsDcOnly = = 0 ) {
   if( ( ( CuPredMode[ chType ][ x0 ][ y0 ] = = MODE_INTER &&
         sps_explicit_mts_inter_enabled_flag ) ||
         (CuPredMode[ chType ][ x0 ][ y0 ] = = MODE_INTRA &&
         sps_explicit_mts_intra_enabled_flag ) ) )
      mts_idx                                                                         ae(v)
   }
  }
 }
}
```

For example, information on symmetric MVD, or a sym_mvd_flag syntax element may be signaled as shown in Tables 7 to 10 or Tables 11 to 15.

For example, referring to Tables 7 to 10 or Tables 11 to 15, the information on symmetric MVD, or the sym_mvd_flag syntax element may be signaled regardless of the mvd_l1_zero_flag syntax element, when the current block is not an affine block, but a block to which bi-prediction is applied, and when there is a symmetric MVD reference index derived by the above method.

That is, even when the mvd_l1_zero_flag syntax element is 1, the sym_mvd_flag syntax element may be 1. In this case, even when the sym_mvd_flag syntax element is 1, MvdL1 may be derived as 0. Although this does not operate according to the sym_mvd_flag syntax element, the sym_mvd_flag syntax element is signaled, and therefore, there is a problem of unnecessary bit signaling.

Meanwhile, according to an embodiment of this document, when the value of the mvd_l1_zero_flag syntax element is 1, and when the value of the sym_mvd_flag syntax element is 1, the value of MvdL1 may be derived as a mirrored value of the value of MvdL0 even when the mvd_l1_zero_flag syntax element is 1.

For example, information about symmetric MVD or a sym_mvd_flag syntax element may be signaled based on at least a part of coding unit syntax such as Tables 16 and 17. Here, Table 16 and Table 17 may represent a part of one syntax continuously.

TABLE 16

| | Descriptor |
|---|---|
| coding_unit( x0, y0, cbWidth, cbHeight, treeType ) { | |
| ... | |
|   } else if ( CuPredMode[ x0 ][ y0 ] = = MODE_IBC ) { | |
|     mvd_coding( x0, y0, 0, 0 ) | |
|     mvp_l0_flag[ x0 ][ y0 ] | ae(v) |
|     if( sps_amvr_enabled_flag && | |
|       ( MvdL0[ x0 ][ y0 ][ 0 ] != 0 || MvdL0[ x0 ][ y0 ][ 1 ] != 0 ) ) { | |
|       amvr_precision_flag[ x0 ][ y0 ] | ae(v) |
|     } | |
|   } else { | |
|     if( slice_type = = B ) | |

TABLE 16-continued

| | Descriptor |
|---|---|
|     inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
|     if( sps_smvd_enabled_flag && inter_pred_idc[ x0 ][ y0 ] = = PRED_BI && | |
|     !inter_affine_flag[ x0 ][ y0 ] && RefIdxSymL0 > −1 && RefIdxSymL1 > −1 ) | |
|       sym_mvd_flag[ x0 ][ y0 ] | ae(v) |
|     if( inter_pred_idc[ x0 ][ y0 ] != PRED_L1 ) { | |
|       if( NumRefIdxActive[ 0 ] > 1 && !sym_mvd_flag[ x0 ][ y0 ] ) | |
|         ref_idx_l0[ x0 ][ y0 ] | ae(v) |
|       mvd_coding( x0, y0, 0, 0 ) | |
|       if( MotionModelIdc[ x0 ][ y0 ] > 0 ) | |
|         mvd_coding( x0, y0, 0, 1 ) | |
|       if( MotionModelIdc[ x0 ][ y0 ] > 1 ) | |
|         mvd_coding( x0, y0, 0, 2 ) | |
|       mvp_l0_flag[ x0 ][ y0 ] | ae(v) |
|     } else { | |
|       MvdL0[ x0 ][ y0 ][ 0 ] = 0 | |
|       MvdL0[ x0 ][ y0 ][ 1 ] = 0 | |
|     } | |
|     if( inter_pred_idc[ x0 ][ y0 ] != PRED_L0 ) { | |
|       if( NumRefIdxActive[ 1 ] > 1 && !sym_mvd_flag[ x0 ][ y0 ] ) | |
|         ref_idx_l1[ x0 ][ y0 ] | ae(v) |
|       if( mvd_l1_zero_flag && !sym_mvd_flag[x0][y0] && inter_pred_idc[ x0 ][ y0 ] = = PRED_BI ) { | |
|         MvdL1[ x0 ][ y0 ][ 0 ] = 0 | |
|         MvdL1[ x0 ][ y0 ][ 1 ] = 0 | |
|         MvdCpL1[ x0 ][ y0 ][ 0 ][ 0 ] = 0 | |
|         MvdCpL1[ x0 ][ y0 ][ 0 ][ 1 ] = 0 | |
|         MvdCpL1[ x0 ][ y0 ][ 1 ][ 0 ] = 0 | |
|         MvdCpL1[ x0 ][ y0 ][ 1 ][ 1 ] = 0 | |
|         MvdCpL1[ x0 ][ y0 ][ 2 ][ 0 ] = 0 | |
|         MvdCpL1[ x0 ][ y0 ][ 2 ][ 1 ] = 0 | |
|       } else { | |
|         if( sym_mvd_flag[ x0 ][ y0 ] ) { | |
|           MvdL1[ x0 ][ y0 ][ 0 ] = −MvdL0[ x0 ][ y0 ][ 0 ] | |
|           MvdL1[ x0 ][ y0 ][ 1 ] = −MvdL0[ x0 ][ y0 ][ 1 ] | |

TABLE 17

| |
|---|
|     } else |
|       mvd_coding( x0, y0, 1, 0 ) |
|       if( MotionModelIdc[ x0 ][ y0 ] > 0 ) |
|         mvd_coding( x0, y0, 1, 1 ) |
|       if(MotionModelIdc[ x0 ][ y0 ] > 1 ) |
|         mvd_coding( x0, y0, 1, 2 ) |
|       mvp_l1_flag[ x0 ][ y0 ]     ae(v) |
|     } |
|   } else { |
|     MvdL1[ x0 ][ y0 ][ 0 ] = 0 |
|     MvdL1[ x0 ][ y0 ][ 1 ] = 0 |
|   } |
|   if( ( sps_amvr_enabled_flag && inter_affine_flag[ x0 ][ y0 ] = = 0 && |
|     ( MvdL0[ x0 ][ y0 ][ 0 ] != 0 ∥ MvdL0[ x0 ][ y0 ][ 1 ] != 0 ∥ |
|     MvdL1[ x0 ][ y0 ][ 0 ] != 0 ∥ MvdL1[ x0 ][ y0 ][ 1 ] != 0 ) ) ∥ |
|     ( sps_affine_amvr_enabled_flag && inter_affine_flag[ x0 ][ y0 ] = = 1 && |
|     ( MvdCpL0[ x0 ][ y0 ][ 0 ][ 0 ] != 0 ∥ MvdCpL0[ x0 ][ y0 ][ 0 ][ 1 ] != 0 ∥ |
|     MvdCpL1[ x0 ][ y0 ][ 0 ][ 0 ] != 0 ∥ MvdCpL1[ x0 ][ y0 ][ 0 ][ 1 ] != 0 ∥ |
|     MvdCpL0[ x0 ][ y0 ][ 1 ][ 0 ] != 0 ∥ MvdCpL0[ x0 ][ y0 ][ 1 ][ 1 ] != 0 ∥ |
|     MvdCpL1[ x0 ][ y0 ][ 1 ][ 0 ] != 0 ∥ MvdCpL1[ x0 ][ y0 ][ 1 ][ 1 ] != 0 ∥ |
|     MvdCpL0[ x0 ][ y0 ][ 2 ][ 0 ] != 0 ∥ MvdCpL0[ x0 ][ y0 ][ 2 ][ 1 ] != 0 ∥ |
|     MvdCpL1[ x0 ][ y0 ][ 2 ][ 0 ] != 0 ∥ MvdCpL1[ x0 ][ y0 ][ 2 ][ 1 ] != 0 ) ) { |
|     ... |

For example, referring to Tables 16 and 17, the value of MvdL1 may be derived based on the value of the mvd_l1_zero_flag syntax element, the value of the sym_mvd_flag syntax element, and whether or not bi-prediction is applied. That is, based on the value of the mvd_l1_zero_flag syntax element, the value of the sym_mvd_flag syntax element, and whether or not bi-prediction is applied, the value of MvdL1 may be derived as 0 or a value of −MvdL0 (the mirrored value of MvdL0).

For example, semantics of the mvd_l1_zero_flag syntax element in Tables 16 and 17 may be as shown in Table 18.

TABLE 18 mvd_l1_zero_flag equal to 1 indicates that the mvd_coding( x0, y0, 1 ) syntax structure is not parsed and MvdL1[ x0 ][ y0 ][ compIdx ] is set equal to as following:
- if sym_mvd_flag[x0][y0] is equal to 0
  MvdL1[ x0 ][ y0 ] is set equal to 0 for compIdx = 0..1.
- otherwise
  MvdL1[ x0 ][ y0 ][ 0 ] = ( −MvdL0[ x0 ][ y0 ][ 0 ])
  MvdL1[ x0 ][ y0 ][ 1 ] = ( −MvdL0[ x0 ][ y0 ][ 1 ])
mvd_l1_zero_flag equal to 0 indicates that the mvd_coding( x0, y0, 1 ) syntax structure is parsed.

Meanwhile, according to an embodiment of this document, when the value of the mvd_l1_zero_flag syntax element is 1, the sym_mvd_flag syntax element may not be parsed. That is, when the value of the mvd_l1_zero_flag syntax element is 1, symmetric MVD may not be allowed. In other words, when the value of the mvd_l1_zero_flag syntax element is 1, the decoding apparatus may not parse the sym_mvd_flag syntax element, and the encoding apparatus may configure the sym_mvd_flag syntax element not to be parsed (from bitstream, image/video information, CU syntax, inter prediction mode information, or prediction related information). Alternatively, according to an embodiment, when the value of the mvd_l1_zero_flag syntax element is 0, a symmetric MVD index may be deduced or derived. Here, the symmetric MVD index may indicate a symmetric MVD reference (picture) index. For example, when symmetric MVD is applied to the current block (e.g., sym_mvd_flag==1), L0/L1 reference (picture) index information for the current block (e.g., ref_idx_l0 and/or ref_idx_l1) may not be explicitly signaled, and the symmetric MVD reference index may be deduced or derived.

For example, in this case, a decoding procedure of symmetric motion vector difference reference indices may be as shown in Table 19 below, but is not limited thereto. For example, the symmetric MVD reference index for L0 prediction may be represented as RefIdxSymL0, and the symmetric MVD reference index for L1 prediction may be represented as RefIdxSymL1.

TABLE 19

1.1.2 Decoding process for symmetric motion vector difference reference indices

Output of this process are RefIdxSymL0 and RefIdxSymL1 specifying the list 0 and list 1 reference picture indices for symmetric motion vector differences, i.e., when sym_mvd_flag is equal to 1 for a coding unit.
If mvd_l1_zero_flag is equal to 1, the variable RefIdxSymL0 and RefIdxSymL1 are set equal to −1.
Otherwise The variable RefIdxSymLX with X being 0 and 1 is derived as follows:
- The variable currPic specifies the current picture.
- RefIdxSymL0 is set equal to −1.
- For each index i with i = 0..NumRefIdxActive[ 0 ] − 1, the following applies:
  - When all of the following conditions are true, RefIdxSymL0 is set to i:
    - DiffPicOrderCnt( currPic, RefPicList[ 0 ][ i ] ) > 0,
    - DiffPicOrderCnt( currPic, RefPicList[ 0 ][ i ] ) <
      DiffPicOrderCnt( currPic, RefPicList[ 0 ][ RefIdxSymL0 ] ) or RefIdxSymL0 is equal to −1.
- RefIdxSymL1 is set equal to −1.
- For each index i with i = 0..NumRefIdxActive[ 1 ] − 1, the following applies:
  - When all of the following conditions are true, RefIdxSymL1 is set to i:
    - DiffPicOrderCnt( currPic, RefPicList[ 1 ][ i ] ) < 0,
    - DiffPicOrderCnt( currPic, RefPicList[ 1 ][ i ] ) >
      DiffPicOrderCnt( currPic, RefPicList[ 1 ][ RefIdxSymL1 ] ) or RefIdxSymL1 is equal to −1.
- When RefIdxSymL0 is equal to −1 or RefIdxSymL1 is equal to −1, the following applies:
  - For each index i with i = 0..NumRefIdxActive[ 0 ] − 1, the following applies:
    - When all of the following conditions are true, RefIdxSymL0 is set to i:
      - DiffPicOrderCnt( currPic, RefPicList[ 0 ][ i ] ) < 0,
      - DiffPicOrderCnt( currPic, RefPicList[ 0 ][ i ] ) >
        DiffPicOrderCnt( currPic, RefPicList[ 0 ][ RefIdxSymL0 ] ) or RefIdxSymL0 is equal to −1.
  - For each index i with i = 0..NumRefIdxActive[ 1 ] − 1, the following applies:
    - When all of the following conditions are true, RefIdxSymL1 is set to i:
      - DiffPicOrderCnt( currPic, RefPicList[ 1 ][ i ] ) > 0,
      - DiffPicOrderCnt( currPic, RefPicList[ 1 ][ i ] ) <
        DiffPicOrderCnt( currPic, RefPicList[ 1 ][ RefIdxSymL1 ] ) or RefIdxSymL1 is equal to −1.

Or, for example, information on symmetric MVD or a sym_mvd_flag syntax element may be signaled based on at least a part of coding unit syntax such as Tables 20 and 21. Here. Table 20 and Table 21 may continuously show a part of one syntax.

TABLE 20

| | Descriptor |
|---|---|
| coding_unit( x0, y0, cbWidth, cbHeight, cqtDepth, treeType, modeType ) { | |
| ... | |
| } else if( treeType != DUAL_TREE_CHROMA ) { /* MODE_INTER or MODE_IBC */ | |
|   if( cu_skip_flag[ x0 ][ y0 ] = = 0 ) | |
|     general_merge_flag[ x0 ][ y0 ] | ae(v) |
|   if( general_merge_flag[ x0 ][ y0 ] ) | |
|     merge_data( x0, y0, cbWidth, cbHeight, chType ) | |
|   else if( CuPredMode[ chType ][ x0 ][ y0 ] = = MODE_IBC ) { | |
|     mvd_coding( x0, y0, 0, 0 ) | |
|     if( MaxNumIbcMergeCand > 1 ) | |
|       mvp_l0_flag[ x0 ][ y0 ] | ae(v) |
|     if( sps_amvr_enabled_flag && | |
|       ( MvdL0[ x0 ][ y0 ][ 0 ] != 0 \|\| MvdL0[ x0 ][ y0 ][ 1 ] != 0 ) ) | |
|       amvr_precision_idx[ x0 ][ y0 ] | ae(v) |
|   } else { | |
|     if( sh_slice_type = = B ) | |
|       inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
|     if( sps_smvd_enabled_flag && !ph_mvd_l1_zero_flag && | |
|       inter_pred_ idc[ x0 ][ y0 ] = = PRED_BI && | |
|       !inter_affine_flag[ x0 ][ y0 ] && RefIdxSymL0 > -1 && RefIdxSymL1 > -1 ) | |
|       sym_mvd_flag[ x0 ][ y0 ] | ae(v) |
|     if( inter_pred_idc[ x0 ][ y0 ] != PRED_L1 ) { | |
|       if( NumRefIdxActive[ 0 ] > 1 && !sym_mvd_ flag[ x0 ][ y0 ] ) | |
|         ref_idx_l0[ x0 ][ y0 ] | ae(v) |
|       mvd_coding( x0, y0, 0, 0 ) | |
|       if( MotionModelIdc[ x0 ][ y0 ] > 0 ) | |
|         mvd_coding( x0, y0, 0, 1 ) | |
|       if(MotionModelIdc[ x0 ][ y0 ] > 1 ) | |
|         mvd_coding( x0, y0, 0, 2 ) | |
|       mvp_l0_flag[ x0 ][ y0 ] | ae(v) |
|     } else { | |
|       MvdL0[ x0 ][ y0 ][ 0 ] = 0 | |
|       MvdL0[ x0 ][ y0 ][ 1 ] = 0 | |
|     } | |
|     if( inter_pred _idc[ x0 ][ y0 ] != PRED_L0 ) { | |
|       if( NumRefIdxActive[ 1 ] > 1 && !sym_mvd_flag[ x0 ][ y0 ] ) | |
|         ref_idx_l1[ x0 ][ y0 ] | ae(v) |
|       if( ph_mvd_l1_zero_flag && inter_pred_idc[ x0 ][ y0 ] = = PRED_BI ) { | |
|         MvdL1[ x0 ][ y0 ][ 0 ] = 0 | |
|         MvdL1[ x0 ][ y0 ][ 1 ] = 0 | |
|         MvdCpL1[ x0 ][ y0 ][ 0 ][ 0 ] = 0 | |
|         MvdCpL1[ x0 ][ y0 ][ 0 ][ 1 ] = 0 | |
|         MvdCpL1[ x0 ][ y0 ][ 1 ][ 0 ] = 0 | |

TABLE 21

| | |
|---|---|
|         MvdCpL1[ x0 ][ y0 ][ 1 ][ 1 ] = 0 | |
|         MvdCpL1[ x0 ][ y0 ][ 2 ][ 0 ] = 0 | |
|         MvdCpL1[ x0 ][ y0 ][ 2 ][ 1 ] = 0 | |
|       } else { | |
|         if( sym_mvd_flag[ x0 ][ y0 ] ) { | |
|           MvdL1[ x0 ][ y0 ][ 0 ] = −MvdL0[ x0 ][ y0 ][ 0 ] | |
|           MvdL1[ x0 ][ y0 ][ 1 ] = −MvdL0[ x0 ][ y0 ][ 1 ] | |
|         } else | |
|           mvd_coding( x0, y0, 1, 0 ) | |
|         if( MotionModelIdc[ x0 ][ y0 ] > 0 ) | |
|           mvd_coding( x0, y0, 1, 1 ) | |
|         if(MotionModelIdc[ x0 ][ y0 ] > 1 ) | |
|           mvd_coding( x0, y0, 1, 2 ) | |
|       } | |
|       mvp_l1_flag[ x0 ][ y0 ] | ae(v) |

TABLE 21-continued

```
} else {
  MvdL1[ x0 ][ y0 ][ 0 ] = 0
  MvdL1[ x0 ][ y0 ][ 1 ] = 0
}
if( ( sps_amvr_enabled_flag && inter_affine_flag[ x0 ][ y0 ] = = 0 &&
    ( MvdL0[ x0 ][ y0 ][ 0 ] != 0 || MvdL0[ x0 ][ y0 ][ 1 ] ! = 0 ||
    MvdL1[ x0 ][ y0 ][ 0 ] != 0 || MvdL1[ x0 ][ y0 ][ 1 ] != 0 ) ) ||
    ( sps_affine_amvr_enabled_flag && inter_affine_flag[ x0 ][ y0 ] = = 1 &&
    ( MvdCpL0[ x0 ][ y0 ][ 0 ][ 0 ] != 0 || MvdCpL0[ x0 ][ y0 ][ 0 ][ 1 ] != 0 ||
    MvdCpL1[ x0 ][ y0 ][ 0 ][ 0 ] != 0 || MvdCpL1[ x0 ][ y0 ][ 0 ][ 1 ] != 0 ||
    MvdCpL0[ x0 ][ y0 ][ 1 ][ 0 ] != 0 || MvdCpL0[ x0 ][ y0 ][ 1 ][ 1 ] != 0 ||
    MvdCpL1[ x0 ][ y0 ][ 1 ][ 0 ] != 0 || MvdCpL1[ x0 ][ y0 ][ 1 ][ 1 ] != 0 ||
    MvdCpL0[ x0 ][ y0 ][ 2 ][ 0 ] != 0 || MvdCpL0[ x0 ][ y0 ][ 2 ][ 1 ] != 0 ||
    MvdCpL1[ x0 ][ y0 ][ 2 ][ 0 ] != 0 || MvdCpL1[ x0 ][ y0 ][ 2 ][ 1 ] != 0 ) ) {
...
```

For example, referring to Tables 20 and 21, SMVD flag information (ex. sym_mvd_flag syntax element) may be signaled based on at least one of inter prediction type information indicating whether bi-prediction is applied to the current block (ex. inter_pred_idc syntax element), L1 motion vector difference zero flag information (ex. mvd_l1_zero_flag or ph_mvd_l1_zero_flag syntax element), SMVD enabled flag information (ex. sps_smvd_enabled_flag syntax element) and/or inter affine flag information (ex. inter_affine_flag syntax element).

Specifically, for example, based on a case that the inter prediction type information indicates a bi-prediction type, the value of the L1 motion vector difference zero flag information is 0, the value of the SMVD enabled flag information is 1, and the value of the inter affine flag information is 0, the SMVD flag information may be explicitly signaled. That is, when the value of the L1 motion vector difference zero flag information is 1, the SMVD flag information may not be explicitly signaled. In this case, the decoding apparatus may implicitly infer the value of the SMVD flag information as 0. That non-signaling of the SMVD flag information may indicate that the SMVD flag information is not included in prediction related information (or inter prediction mode information) or CU syntax or is not parsed.

Based on the above-described embodiments of the present document, signaling of information on symmetric MVD can be optimized and unnecessary bit waste can be avoided. Through this, overall coding efficiency can be increased.

Figure 10:
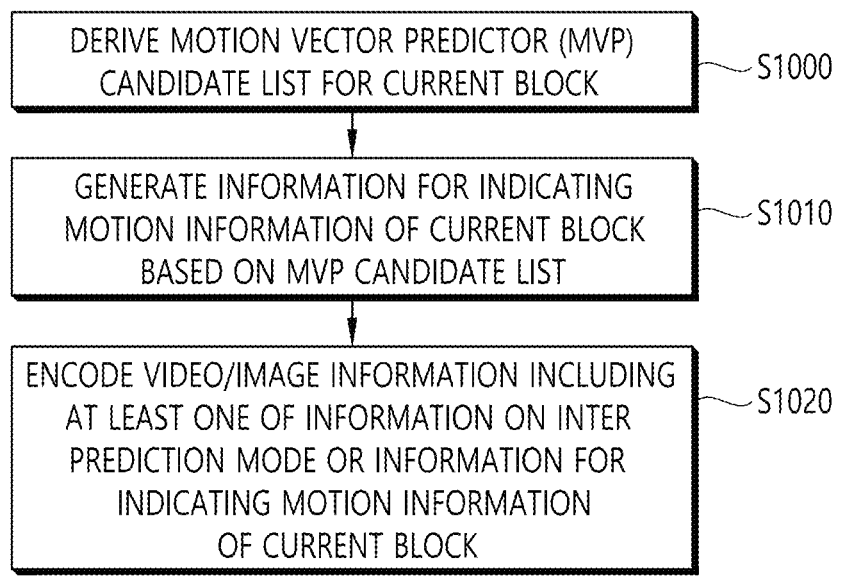
FIGS. 10 and 11 schematically show an example of a video/image encoding method and related components according to embodiment(s) of this document.
Figure 11:
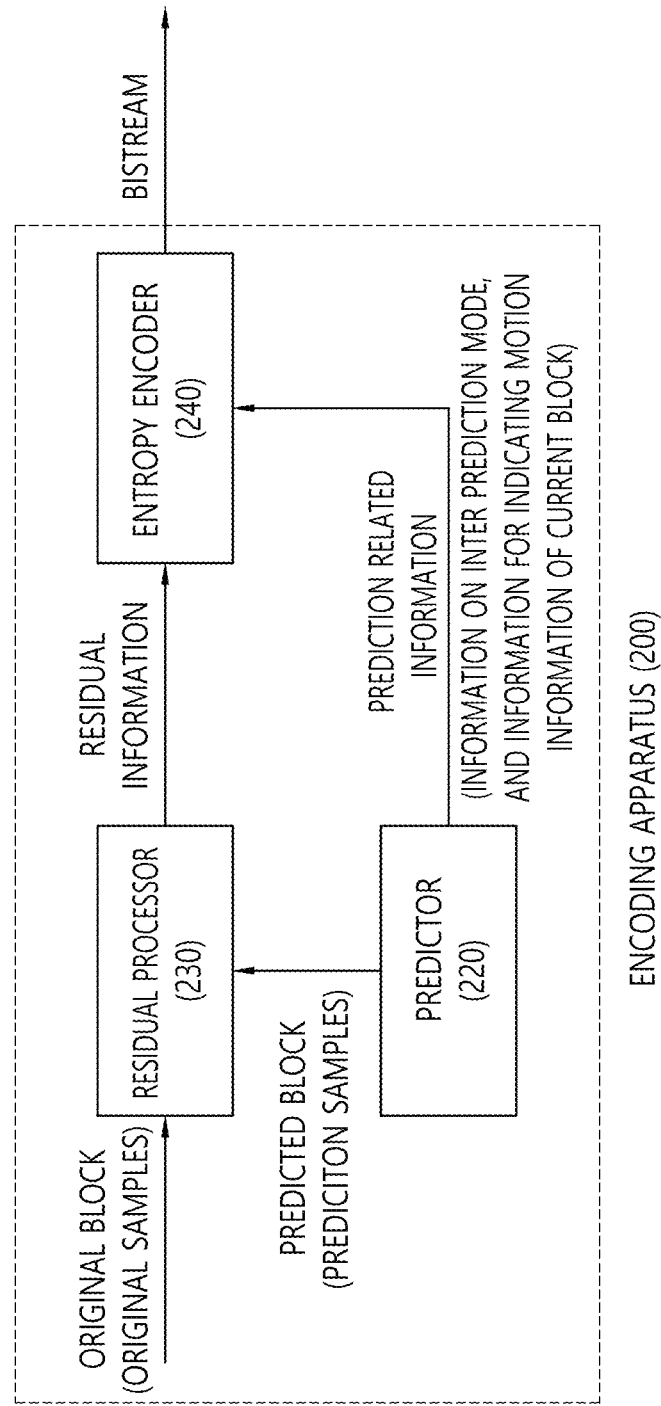

FIGS. 10 and 11 schematically show an example of a video/image encoding method and related components according to embodiment(s) of this document.

The method disclosed in FIG. 10 may be performed by the encoding apparatus disclosed in FIG. 2 or 11. Specifically, for example, S1000 to S1010 of FIG. 10 may be performed by the predictor 220 of the encoding apparatus, and S1020 of FIG. 10 may be performed by the entropy encoder 240 of the encoding apparatus. The method disclosed in FIG. 10 may include the embodiments described above in this document.

Referring to FIG. 10, the encoding apparatus derives an MVP candidate list for the current block (S1000). The encoding apparatus may derive the MVP candidate list based on the inter prediction mode of the current block and neighboring blocks of the current block. As described above, the neighboring blocks may include spatial neighboring blocks and/or temporal neighboring block of the current block. The neighboring blocks may include a bottom-left corner neighboring block, a left neighboring block, a top-right corner neighboring block, a top neighboring block, and a top-left coder neighboring block of the current block.

The encoding apparatus generates information for indicating motion information of the current block based on the MVP candidate list (S1010). The information for indicating the motion information of the current block may include the aforementioned selection information (eg, mvp flag information or mvp index information, etc.). The mvp flag information may include the above-described mvp_l0_flag and/or mvp_l1_flag. In addition, the information for indicating the motion information of the current block may include information on the MVD. For example, the information on the MVD may include at least one of abs_mvd_greater0_flag syntax element, abs_mvd_greater1_flag syntax element, abs_mvd_minus2 syntax element, or mvd_sign_flag syntax element, but it is not limited because other information may be further included thereto. The motion information may include at least one of an L0 motion vector for L0 prediction and an L1 motion vector for L1 prediction. The L0 motion vector may be represented based on the L0 motion vector predictor and the L0 motion vector difference, and the L1 motion vector may be represented based on the L1 motion vector predictor and the L1 motion vector difference.

For example, the encoding apparatus may perform inter prediction on the current block under the consideration of rate distortion (RD) cost in order to generate prediction samples of the current block. Alternatively, for example, the encoding apparatus may determine an inter prediction mode which has been used to generate prediction samples of the current block, and may derive motion information. Here, the inter prediction mode may be a motion vector prediction (MVP) mode, but is not limited thereto. Here, the MVP mode may be referred to as an advanced motion vector prediction (AMVP) mode.

The encoding apparatus may derive optimal motion information for the current block through a motion estimation. For example, the encoding apparatus may search for a similar reference block of a high correlation in a predetermined search range in a reference picture in a fractional pixel unit using an original block in an original picture for the current block, and may derive motion information through this.

The encoding apparatus may construct a motion vector predictor candidate list to represent the derived motion information using a motion vector predictor and/or a motion vector difference. For example, the encoding apparatus may construct a motion vector predictor candidate list, based on a spatial neighboring candidate block and/or a temporal neighboring candidate block. For example, when bi-prediction is applied to the current block, an L0 motion vector predictor candidate list for L0 prediction and an L1 motion vector predictor candidate list for L1 prediction may be constructed, respectively.

The encoding apparatus may determine a motion vector predictor of the current block, based on the motion vector predictor candidate list. For example, the encoding apparatus may determine the motion vector predictor for the current block, based on the derived motion information (or motion vector) from among the motion vector predictor candidates in the motion vector predictor candidate list. Alternatively, the encoding apparatus may determine a motion vector predictor in the motion vector predictor candidate list, which has the smallest difference from the derived motion information (or motion vector). For example, when bi-prediction is applied to the current block, the L0 motion vector predictor for L0 prediction and the L1 motion vector predictor for L1 prediction may be obtained from the L0 motion vector predictor candidate list and the L1 motion vector predictor candidate list, respectively.

The encoding apparatus may generate selection information indicating the motion vector predictor of the motion vector predictor candidate list. For example, the selection information may also be referred to as index information, and may also be referred to as an MVP flag or an MVP index. That is, the encoding apparatus may generate information indicating the motion vector predictor in the motion vector predictor candidate list, which has been used to indicate the motion vector of the current block. For example, when bi-prediction is applied to the current block, selection information for the L0 motion vector predictor and selection information for the L1 motion vector predictor may be generated, respectively.

The encoding apparatus may determine a motion vector difference for the current block based on the motion vector predictor. For example, the encoding apparatus may determine a motion vector difference, based on the derived motion information (or motion vector) for the current block and the motion vector predictor. Alternatively, the encoding apparatus may determine a motion vector difference, based on the derived motion information (or motion vector) for the current block and the difference between the motion vector predictors. For example, when bi-prediction is applied to the current block, the L0 motion vector difference and the L1 motion vector difference may be determined, respectively. Here, the L0 motion vector difference may be represented as MvdL0, and the L1 motion vector difference may be represented as MvdL1. The L0 motion vector may be represented based on the sum of the L0 motion vector predictor and the L0 motion vector difference, and the L1 motion vector may be represented based on the sum of the L1 motion vector predictor and the L1 motion vector difference.

Also, the encoding apparatus may derive motion information of the current block based on the inter prediction mode and generate prediction samples. The motion information may include an L0 motion vector for L0 prediction and/or an L1 motion vector for L1 prediction.

The encoding apparatus may derive L0 prediction samples and L1 prediction samples when the pi-prediction is applied, and may derive prediction samples of the current block based on a weighted sum or weighted average of the L0 prediction samples and L1 prediction samples. The L0 motion vector may indicate the L0 prediction samples on the L0 reference picture, and the L1 motion vector may indicate the L1 prediction samples on the L1 reference picture.

Based on a case that the value of the L1 motion vector difference zero flag information is 0 and the value of the SMVD flag information is 1, the L1 motion vector difference may be derived from the L0 motion vector difference. In this case, the absolute value of the L1 motion vector difference may be the same as the absolute value of the L0 motion vector difference, and the sign of the L1 motion vector difference may be different from the sign of the L0 motion vector difference.

The encoding apparatus may derive residual information based on the prediction samples of the current block. The encoding apparatus may derive residual samples based on the prediction samples. The encoding apparatus may derive residual samples based on original samples for the current block and prediction samples for the current block. The encoding apparatus may derive residual information based on the residual samples. The residual information may include information on quantized transform coefficients. The encoding apparatus may derive quantized transform coefficients by performing a transform/quantization procedure on the residual samples.

The encoding apparatus encodes video/image information (S1020). The video/image information may include at least one of information on the inter prediction mode and information for indicating motion information of the current block. The video/image information may further include the residual information. The encoded image/video information may be output in the form of a bitstream. The bitstream may be transmitted to the decoding apparatus through a network or a storage medium. The bitstream may include encoded (image/video) information.

The video/image information may include inter prediction type information (ex. inter_pred_idc), a general merge flag, SMVD flag information, L1 motion vector differential zero flag information, SMVD enabled flag information, and/or inter affine flag information. For example, when the value of the general merge flag is 0, it may indicate that the MVP mode is applied to the current block. The inter prediction type information may indicate whether bi-prediction is applied to the current block. Specifically, for example, the inter prediction type information may indicate whether L0 prediction, L1 prediction, or bi-prediction is applied to the current block.

For example, the image information includes L1 motion vector difference zero flag information, the image information includes a coding unit (CU) syntax for the current block, and based on the L1 motion vector difference zero flag information, it may be determined whether the CU syntax includes SMVD flag information indicating whether symmetric motion vector differences (SMVD) is applied to the current block.

Specifically, for example, the image information may include header information. The header information may include a slice header or a picture header. The header information may include the L1 motion vector difference zero flag information, and the CU syntax may include the SMVD flag information based on a case in which the value of the L1 motion vector difference zero flag information is 0. For example, when the value of the mvd_l1_zero_flag syntax element is 1, the decoding apparatus may not parse the sym_mvd_flag syntax element, and the encoding apparatus may configure that the sym_mvd_flag syntax element is not parsed (from bitstream, video/video information, CU syntax, inter prediction mode information or prediction-related information).

Also, as an example, based on a case in which the value of the L1 motion vector difference zero flag information is 1, the CU syntax may not include the SMVD flag information. In this case, the decoding apparatus may infer that the value of the SMVD flag information is 0 without parsing the SMVD flag information.

Also, as an example, It is determined whether the SMVD flag information is included in the CU syntax based on the value of the symmetric motion vector difference reference index for the current block, and the value of the symmetric motion vector differential reference index is derived as −1 based on the L1 motion vector differential zero flag information having a value of 1, and it is determined that the SMVD flag information is not included in the CU syntax based on the symmetric motion vector difference index having value −1. For example, the symmetric motion vector difference reference index may include an L0 symmetric motion vector difference reference index and an L1 symmetric motion vector difference reference index, each of which may be determined as a value of −1. Here, the L0 symmetric motion vector difference reference index may be expressed as RefIdxSymL0, and the L1 symmetric motion vector difference reference index may be expressed as RefIdxSymL1. For example, the SMVD flag information may be included in the inter prediction mode information or CU syntax when RefIdxSymL0 and RefIdxSymL1 are respectively greater than −1. Alternatively, for example, the inter prediction mode information or CU syntax may include the symmetric motion vector difference flag, based on RefIdxSymL0 greater than −1 and RefIdxSymL1 greater than −1.

Also, as an example, the image information includes a sequence parameter set (SPS), the SPS includes SMVD enabled flag information, the CU syntax includes prediction type information and inter affine flag information, the prediction type information indicates whether bi-prediction is applied to the current block, and the CU syntax may include the SMVD flag information based on the SMVD enabled flag information, the prediction type information, and the inter affine flag information.

Specifically, for example, based on a case that the inter prediction type information indicates a bi-prediction type, the value of the L1 motion vector difference zero flag information is 0, the value of the SMVD enabled flag information is 1, and the value of the inter affine flag information is 0, the SMVD flag information may be included in the CU syntax to be explicitly signaled. That is, when the value of the L1 motion vector difference zero flag information is 1, the SMVD flag information may not be explicitly signaled. In this case, the decoding apparatus may implicitly infer the value of the SMVD flag information as 0. That the SMVD flag information is not signaled may indicate that the SMVD flag information is not included in prediction related information (or inter prediction mode information) or CU syntax.

The video/image information may include information on the motion vector difference. For example, the information on the motion vector difference may include information representing the motion vector difference. When the SMVD is applied, the information on the motion vector difference may include only information on the L0 motion vector difference, and the L1 motion vector difference may be derived based on the L0 motion vector difference as described above.

The zero flag for the L1 motion vector difference may indicate information on whether the L1 motion vector difference is 0, and may be referred to as an L1 motion vector difference zero flag, an L1 MVD zero flag, and an MVD L1 zero flag. In addition, the L1 motion vector differential zero flag may be expressed as an mvd_l1_zero_flag syntax element or a ph_mvd_l1_zero_flag syntax element. In addition, the SMVD flag information may indicate information on whether the L0 motion vector difference and the L1 motion vector difference are symmetric, and may be expressed as a sym_mvd_flag syntax element.

Also, the encoding apparatus may derive (modified) residual samples based on the residual information, and may generate reconstructed samples based on the (modified) residual samples and the prediction samples. Also, a reconstructed block and a reconstructed picture may be derived based on the reconstructed samples. The derived reconstructed picture may be referenced for inter prediction of a subsequent picture.

For example, the encoding apparatus may generate a bitstream or encoded information by encoding image/video information including all or some of the above-described informations (or syntax elements). Alternatively, it may be output in the form of a bitstream. In addition, the bitstream or encoded information may be transmitted to the decoding apparatus through a network or a storage medium. Alternatively, the bitstream or the encoded information may be stored in a computer-readable storage medium, and the bitstream or the encoded information may be generated by the above-described image/video encoding method.

Figure 12:
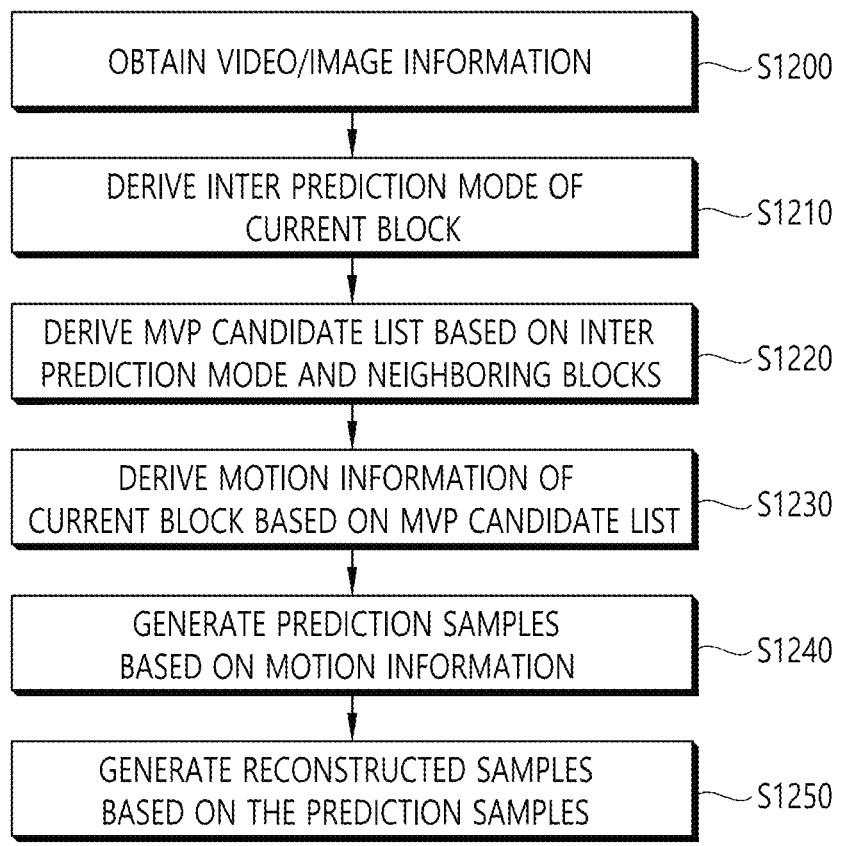
FIGS. 12 and 13 schematically show an example of a video/image decoding method and related components according to embodiment(s) of this document.
Figure 13:
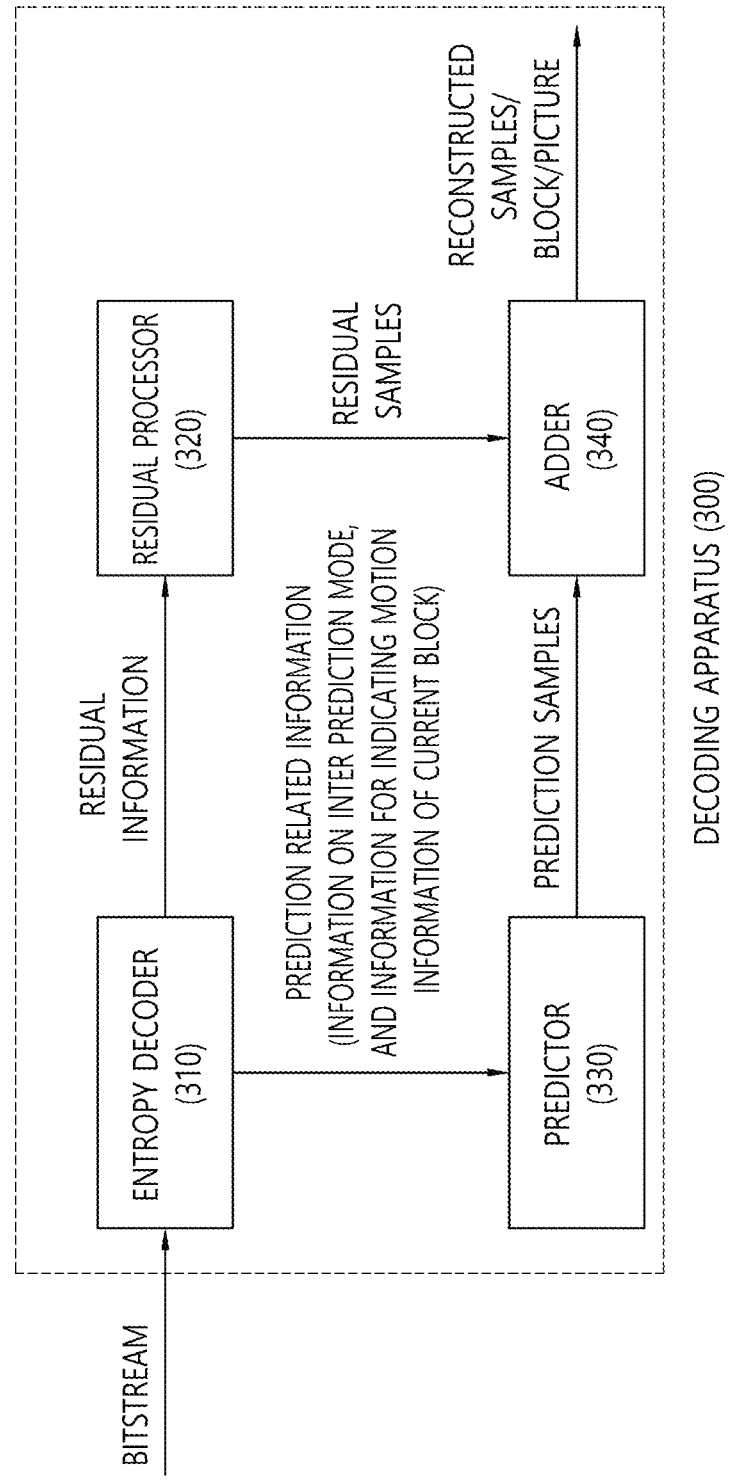

FIGS. 12 and 13 schematically show an example of a video/image decoding method and related components according to embodiment(s) of this document.

The method disclosed in FIG. 12 may be performed by the decoding apparatus disclosed in FIG. 3 or 13. Specifically, for example, S1200 of FIG. 12 may be performed by the entropy decoder 310 of the decoding apparatus, S1210 through S1240 of FIG. 12 may be performed by the predictor 330 of the decoding apparatus, and S1250 of FIG. 12 may be performed by the adder 340 or the reconstructor of the decoding apparatus. The method disclosed in FIG. 12 may include the embodiments described above in this document.

Referring to FIG. 12, the decoding apparatus obtains video/image information from a bitstream (S1000). The video/image information may include at least one of the information on the inter prediction mode or information for indicating motion information of the current block. The video/image information further include the residual information. For example, the decoding apparatus may obtain the video/image information by parsing or decoding the bitstream. For example, the prediction-related information may include information indicating a prediction mode and/or motion information used to generate prediction samples of the current block. The prediction-related information may include the selection information or information on a motion vector difference.

The information for indicating the motion information of the current block may include the aforementioned selection information (eg, mvp flag information or mvp index information, etc.). The mvp flag information may include the above-described mvp_l0_flag and/or mvp_l1_flag. In addition, the information for indicating the motion information of the current block may include information on the MVD.

For example, the selection information may also be referred to as index information, and may also be referred to as an MVP flag or an MVP index. That is, the selection information may indicate information indicating the motion vector predictor of the current block in the motion vector predictor candidate list. For example, when bi-prediction is applied to the current block, the selection information may include selection information for L0 prediction and selection information for L1 prediction. The selection information for L0 prediction may indicate information indicating a motion vector predictor in the L0 motion vector predictor candidate list for L0 prediction, which will be described later, while the selection information for L1 prediction may indicate information indicating a motion vector predictor in an L1 motion vector predictor candidate list for L1 prediction, which will be described later.

For example, the information on the motion vector difference (MVD) may include information used to derive the motion vector difference. For example, the information on the motion vector difference may include at least one of abs_mvd_greater0_flag syntax element, abs_mvd_greater1_flag syntax element, abs_mvd_minus2 syntax element, or mvd_sign_flag syntax element, but not be limited thereto as it may further include other information. For example, when bi-prediction is applied to the current block, the information about the motion vector difference may include information about the motion vector difference for L0 prediction and information about the motion vector difference for L1 prediction.

The video/image information may include, for the information on the inter prediction mode, inter prediction type information (ex. inter_pred_idc), a general merge flag, SMVD flag information, L1 motion vector difference zero flag information, SMVD enabled flag information, and/or inter affine flag information. For example, when the value of the general merge flag is 0, it may indicate that the MVP mode is applied to the current block. The inter prediction type information may indicate whether bi-prediction is applied to the current block. Specifically, for example, the inter prediction type information may indicate whether L0 prediction, L1 prediction, or bi-prediction is applied to the current block. The prediction-related information may include information on a motion vector difference.

For example, the image information includes L1 motion vector difference zero flag information, the image information includes a coding unit (CU) syntax for the current block, and based on the L1 motion vector difference zero flag information, it may be determined whether the CU syntax includes SMVD flag information indicating whether symmetric motion vector differences (SMVD) is applied to the current block.

Specifically, for example, the image information may include header information. The header information may include a slice header or a picture header. The header information may include the L1 motion vector difference zero flag information, and the CU syntax may include the SMVD flag information based on a case in which the value of the L1 motion vector difference zero flag information is 0. For example, when the value of the mvd_l1_zero_flag syntax element is 1, the decoding apparatus may not parse the sym_mvd_flag syntax element, and the encoding apparatus may configure that the sym_mvd_flag syntax element is not parsed (from bitstream, video/video information, CU syntax, inter prediction mode information or prediction-related information).

Also, as an example, based on a case in which the value of the L1 motion vector difference zero flag information is 1, the CU syntax may not include the SMVD flag information. In this case, the decoding apparatus may infer that the value of the SMVD flag information is 0 without parsing the SMVD flag information.

Also, as an example, It is determined whether the SMVD flag information is included in the CU syntax based on the value of the symmetric motion vector difference reference index for the current block, and the value of the symmetric motion vector differential reference index is derived as −1 based on the L1 motion vector differential zero flag information having a value of 1, and it is determined that the SMVD flag information is not included in the CU syntax based on the symmetric motion vector difference index having value −1. For example, the symmetric motion vector difference reference index may include an L0 symmetric motion vector difference reference index and an L1 symmetric motion vector difference reference index, each of which may be determined as a value of −1. Here, the L0 symmetric motion vector difference reference index may be expressed as RefIdxSymL0, and the L1 symmetric motion vector difference reference index may be expressed as RefIdxSymL1. For example, the SMVD flag information may be included in the inter prediction mode information or CU syntax when RefIdxSymL0 and RefIdxSymL1 are respectively greater than −1. Alternatively, for example, the inter prediction mode information or CU syntax may include the symmetric motion vector difference flag, based on RefIdxSymL0 greater than −1 and RefIdxSymL1 greater than −1.

Also, as an example, the image information includes a sequence parameter set (SPS), the SPS includes SMVD enabled flag information, the CU syntax includes prediction type information and inter affine flag information, the prediction type information indicates whether bi-prediction is applied to the current block, and the CU syntax may include the SMVD flag information based on the SMVD enabled flag information, the prediction type information, and the inter affine flag information.

Specifically, for example, based on a case that the inter prediction type information indicates a bi-prediction type, the value of the L1 motion vector difference zero flag information is 0, the value of the SMVD enabled flag information is 1, and the value of the inter affine flag information is 0, the SMVD flag information may be included in the CU syntax to be explicitly signaled. That is, when the value of the L1 motion vector difference zero flag information is 1, the SMVD flag information may not be explicitly signaled. In this case, the decoding apparatus may implicitly infer the value of the SMVD flag information as 0. That the SMVD flag information is not signaled may indicate that the SMVD flag information is not included in prediction related information (or inter prediction mode information) or CU syntax.

The video/image information may include information on the motion vector difference. For example, the information on the motion vector difference may include information representing the motion vector difference. When the SMVD is applied, the information on the motion vector difference may include only information on the L0 motion vector difference, and the L1 motion vector difference may be derived based on the L0 motion vector difference as described above.

The zero flag for the L1 motion vector difference may indicate information on whether the L1 motion vector difference is 0, and may be referred to as an L1 motion vector difference zero flag, an L1 MVD zero flag, and an MVD L1 zero flag. In addition, the L1 motion vector differential zero flag may be expressed as an mvd_l1_zero_flag syntax element or a ph_mvd_l1_zero_flag syntax element. In addition, the SMVD flag information may indicate information on whether the L0 motion vector difference and the L1 motion vector difference are symmetric, and may be expressed as a sym_mvd_flag syntax element.

Or, for example, the L1 motion vector difference may be represented from the L0 motion vector difference based on the L1 motion vector difference zero flag equal to zero or the symmetric motion vector difference flag equal to one. That is, when the value of the L1 motion vector difference zero flag is 0 or the value of the symmetric motion vector difference flag is 1, the L1 motion vector difference may be represented from the L0 motion vector difference. Alternatively, the L1 motion vector difference may be represented as a mirrored value of the L0 motion vector difference. For example, when the value of the mvd_l1_zero_flag syntax element or the ph_mvd_l1_zero_flag syntax element is 0 or the value of the sym_mvd_flag syntax element is 1, MvdL1 may be represented based on MvdL0. Alternatively, MvdL1 may be determined as −MvdL0. For example, when MvdL1 is −MvdL0, the absolute value, that is, the magnitude of the L1 motion vector difference is the same as the absolute value, that is, the magnitude of the L0 motion vector difference, and the sign of the L1 motion vector difference is different from the sign of the L0 motion vector difference.

The decoding apparatus derives the inter prediction mode of the current block based on the image information (S1210). For example, the decoding apparatus may derive the inter prediction mode based on the information on the inter prediction mode included in the image information. For example, the inter prediction mode may be a motion vector prediction (MVP) mode, but is not limited thereto. Here, the MVP mode may be referred to as an advanced motion vector prediction (AMVP) mode.

The decoding apparatus derives an MVP candidate list based on the inter prediction mode and neighboring blocks of the current block (S1220). For example, the decoding apparatus may configure the MVP candidate list based on spatial neighboring candidate blocks and/or a temporal neighboring candidate block. The MVP candidate list configured here may be the same as the MVP candidate list configured in the encoding apparatus. The neighboring blocks may include a bottom-left corner neighboring block, a left neighboring block, a top-right corner neighboring block, a top neighboring block, and a top-left coder neighboring block of the current block. For example, when bi-prediction is applied to the current block, an L0 MVP candidate list for L0 prediction and an L1 MVP candidate list for L1 prediction may be configured, respectively.

The decoding apparatus may derive the motion information of the current block based on the MVP candidate list (S1230). For example, the decoding apparatus may derive a motion vector predictor candidate for the current block in the motion vector predictor candidate list, based on the above-described selection information, and may derive motion information (or motion vector) of the current block, based on the derived motion vector predictor candidate. Alternatively, the motion information (or motion vector) of the current block may be derived based on the motion vector difference derived by the above-described information about the motion vector difference and the derived motion vector predictor candidate. For example, when bi-prediction is applied to the current block, the L0 motion vector predictor for L0 prediction and the L1 motion vector predictor for L1 prediction are based on selection information for L0 prediction and selection information for L1 prediction may be derived, respectively from the L0 motion vector predictor candidate list and the L1 motion vector predictor candidate list, based on selection information for L0 prediction and selection information for L1 prediction. For example, when bi-prediction is applied to the current block, the L0 motion vector difference and the L1 motion vector difference may be derived based on information about the motion vector difference, respectively. Here, the L0 motion vector difference may be represented as MvdL0, and the L1 motion vector difference may be represented as MvdL1. Also, the motion vector of the current block may be derived as the L0 motion vector and the L1 motion vector, respectively.

The decoding apparatus generates prediction samples of the current block, based on the motion information (S1240). For example, when bi-prediction is applied to the current block, the decoding apparatus may generate L0 prediction samples for L0 prediction, based on the L0 motion vector, and L1 prediction samples for L1 prediction, based on the L1 motion vector. Additionally, the decoding apparatus may generate prediction samples of the current block, based on the L0 prediction samples and the L1 prediction samples.

The decoding apparatus generates reconstructed samples based on the prediction samples (S1250). A reconstructed block or a reconstructed picture may be derived based on the reconstructed samples. As described above, an in-loop filtering procedure may be further applied to the reconstructed samples/block/picture.

The decoding apparatus may generate the reconstructed samples based on the prediction samples and residual samples. In this case, the decoding apparatus may derive the residual samples based on the residual information. For example, the residual information may represent information used to derive residual samples, and may include information on residual samples, inverse transform related information, and/or inverse quantization related information. For example, the residual information may include information on quantized transform coefficients.

For example, the decoding apparatus may obtain video/image information including all or parts of the above-described pieces of information (or syntax elements) by decoding the bitstream or the encoded information. Further, the bitstream or the encoded information may be stored in a computer readable storage medium, and may cause the above-described decoding method to be performed.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments of the present disclosure are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present disclosure may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VOD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Bluray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

FIG. 142 represents an example of a contents streaming system to which the embodiment of the present document may be applied.

Figure 14:
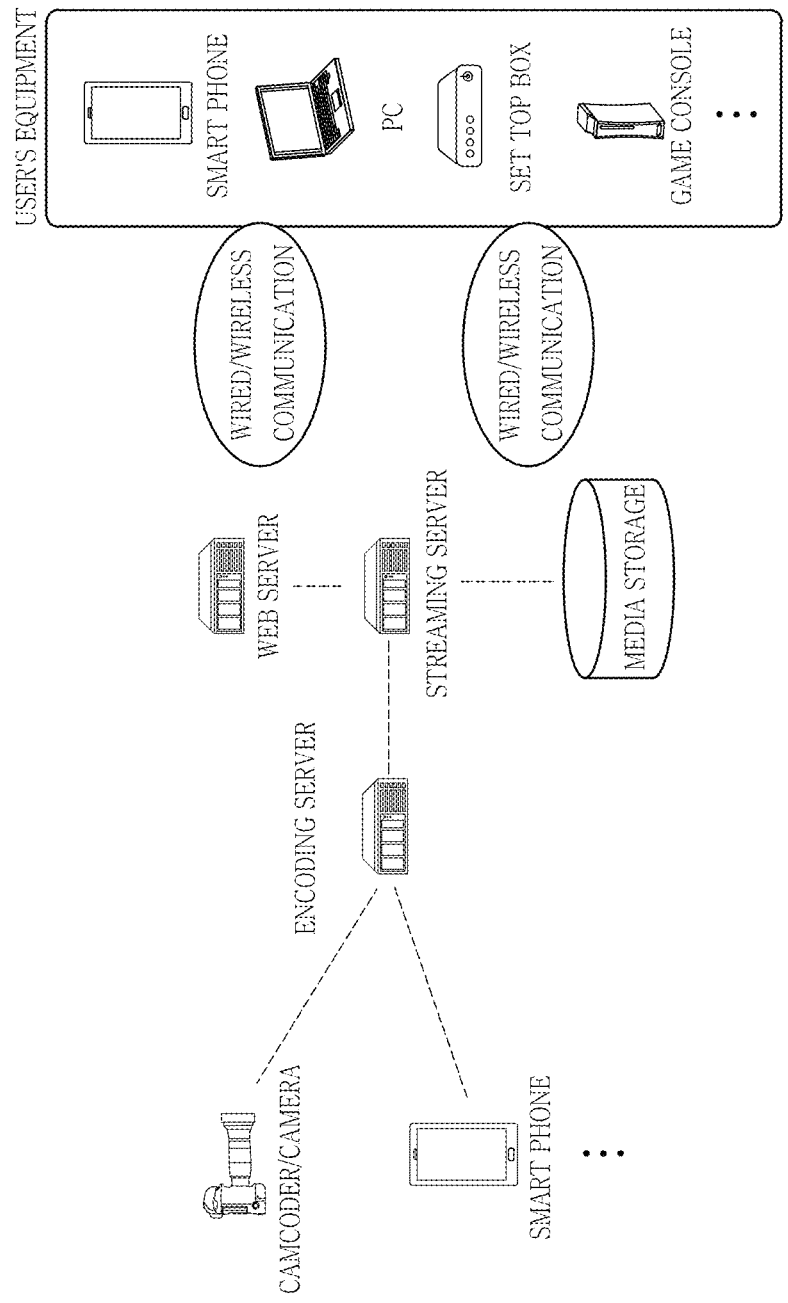
FIG. 14 represents an example of a content streaming system to which embodiments disclosed in this document may be applied.

Referring to FIG. 14, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present description can be combined in a various way. For example, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. An image decoding method performed by a decoding apparatus, the method comprising:
obtaining image information from a bitstream;
deriving inter prediction mode for a current block based on the image information;
deriving a motion vector predictor (MVP) candidate list for the current block based on the inter prediction mode and neighboring blocks of the current block;
deriving motion information of the current block based on the MVP candidate list;
generating prediction samples of the current block based on the motion information;
generating reconstructed samples based on the prediction samples,
wherein the motion information includes at least one of an L0 motion vector for L0 prediction or an L1 motion vector for L1 prediction,
wherein the L0 motion vector is derived based on an L0 motion vector predictor and an L0 motion vector difference, and the L1 motion vector is derived based on an L1 motion vector predictor and an L1 motion vector difference, wherein the image information includes an L1 motion vector difference zero flag, wherein the image information includes a coding unit (CU) syntax for the current block, wherein the CU syntax includes a symmetric motion vector differences (SMVD) flag for the current block, wherein based on a value of the SMVD flag being equal to 1, the L1 motion vector difference is derived from the L0 motion vector difference, wherein based on a value of the L1 motion vector difference zero flag being equal to 1, the L1 motion vector difference is derived as 0, and wherein the L1 motion vector difference is derived as 0 only when the value of the SMVD flag is not equal to 1.

2. The image decoding method of claim 1, wherein the image information includes header information, and wherein the header information includes the L1 motion vector difference zero flag.

3. The image decoding method of claim 1, wherein the image information includes sequence parameter set (SPS), wherein the SPS include SMVD enabled flag, wherein the CU syntax includes inter prediction type information and an inter affine flag, wherein the inter prediction type information indicate whether bi-prediction is applied to the current block, wherein the CU syntax include the SMVD flag further based on the SMVD enabled flag, the inter prediction type information and the inter affine flag.

4. The image decoding method of claim 1, wherein an absolute value of the L1 motion vector difference is equal to an absolute value of the L0 motion vector difference, and wherein a sign of the L1 motion vector difference is different from a sign of the L0 motion vector difference.

5. An image encoding method performed by an encoding apparatus, the method comprising:

deriving a motion vector predictor (MVP) candidate list for a current block based on inter prediction mode and neighboring blocks of the current block;

generating information for indicating motion information of the current block based on the MVP candidate list; and encoding image information including at least one of information on the inter prediction mode or the information for indicating the motion information of the current block, wherein the motion information includes at least one of an L0 motion vector for L0 prediction or an L1 motion vector for L1 prediction, wherein the L0 motion vector is derived based on an L0 motion vector predictor and an L0 motion vector difference, and the L1 motion vector is derived based on an L1 motion vector predictor and an L1 motion vector difference, wherein the image information includes an L1 motion vector difference zero flag, wherein the image information includes a coding unit (CU) syntax for the current block, wherein the CU syntax includes a symmetric motion vector differences (SMVD) flag for the current block, wherein based on a value of the SMVD flag being equal to 1, the L1 motion vector difference is derived from the L0 motion vector difference, wherein based on a value of the L1 motion vector difference zero flag being equal to 1, the L1 motion vector difference is derived as 0, and wherein the L1 motion vector difference is derived as 0 only when the value of the SMVD flag is not 1.

6. The image encoding method of claim 5, wherein the image information includes header information, and wherein the header information includes the L1 motion vector difference zero flag.

7. The image encoding method of claim 5, wherein the image information includes sequence parameter set (SPS), wherein the SPS include SMVD enabled flag, wherein the CU syntax includes inter prediction type information and an inter affine flag, wherein the inter prediction type information indicate whether bi-prediction is applied to the current block, wherein the CU syntax include the SMVD flag further based on the SMVD enabled flag, the inter prediction type information and the inter affine flag.

8. The image encoding method of claim 5, wherein an absolute value of the L1 motion vector difference is equal to an absolute value of the L0 motion vector difference, and wherein a sign of the L1 motion vector difference is different from a sign of the L0 motion vector difference.

9. An apparatus for transmitting data for image information, comprising:

at least one processor configured to obtain a bitstream for the image information, wherein the bitstream is generated based on deriving a motion vector predictor (MVP) candidate list for a current block based on inter prediction mode and neighboring blocks of the current block, generating information for indicating motion information of the current block based on the MVP candidate list, and encoding image information to generate the bitstream, wherein the image information includes at least one of information on the inter prediction mode or the information for indicating the motion information of the current block; and a transmitter configured to transmit the data including the bitstream, wherein the motion information includes at least one of an L0 motion vector for L0 prediction or an L1 motion vector for L1 prediction, wherein the L0 motion vector is derived based on an L0 motion vector predictor and an L0 motion vector difference, and the L1 motion vector is derived based on an L1 motion vector predictor and an L1 motion vector difference, wherein the image information includes an L1 motion vector difference zero flag, wherein the image information includes a coding unit (CU) syntax for the current block, wherein the CU syntax includes a symmetric motion vector differences (SMVD) flag for the current block, wherein based on a value of the SMVD flag being equal to 1, the L1 motion vector difference is derived from the L0 motion vector difference, wherein based on a value of the L1 motion vector difference zero flag being equal to 1, the L1 motion vector difference is derived as 0, and wherein the L1 motion vector difference is derived as 0 only when the value of the SMVD flag is not equal to 1.

* * * * *